(12) United States Patent
Bearden et al.

(10) Patent No.: US 8,543,681 B2
(45) Date of Patent: Sep. 24, 2013

(54) NETWORK TOPOLOGY DISCOVERY SYSTEMS AND METHODS

(75) Inventors: Mark J. Bearden, Woodstock, GA (US); Lorraine Denby, Berkeley Heights, NJ (US); Bengi Karacali, Basking Ridge, NJ (US); Jean Meloche, Madison, NJ (US); David Thomas Stott, Basking Ridge, NJ (US)

(73) Assignee: Volli Polymer GmbH LLC, Dover, DE (US)

( * ) Notice: Subject to any disclaimer, the term of this patent is extended or adjusted under 35 U.S.C. 154(b) by 1797 days.

(21) Appl. No.: 10/270,335

(22) Filed: Oct. 15, 2002

(65) Prior Publication Data

US 2003/0097438 A1    May 22, 2003

Related U.S. Application Data

(60) Provisional application No. 60/329,569, filed on Oct. 15, 2001.

(51) Int. Cl.
*G06F 15/173* (2006.01)
*G06F 15/16* (2006.01)

(52) U.S. Cl.
USPC ........... 709/224; 709/218; 709/236; 709/242; 709/249

(58) Field of Classification Search
USPC ................ 709/203, 216, 218, 223–229, 238, 709/245, 250, 252, 236, 242, 249; 370/255, 370/389, 392, 399, 395.31, 395.52, 395.53, 370/409, 219, 220, 223, 246, 254, 395.5, 370/395.51–395.54, 465, 466; 718/104; 707/10, 104.1
See application file for complete search history.

(56) References Cited

U.S. PATENT DOCUMENTS

| | | | |
|---|---|---|---|
| 5,276,789 A | 1/1994 | Besaw et al. | |
| 5,375,070 A | 12/1994 | Hershey et al. | |
| 5,440,719 A | 8/1995 | Hanes et al. | |
| 5,539,659 A | 7/1996 | McKee et al. | |
| 5,542,047 A | 7/1996 | Armstrong | |
| 5,572,640 A | 11/1996 | Schettler | |
| 5,615,323 A | 3/1997 | Engel et al. | |
| 5,634,009 A | 5/1997 | Iddon et al. | |
| 5,666,353 A | 9/1997 | Klausmeier et al. | |
| 5,706,436 A | 1/1998 | Lewis et al. | |
| 5,751,965 A | 5/1998 | Mayo et al. | |
| 5,838,919 A | 11/1998 | Schwaller et al. | |
| 5,881,237 A | 3/1999 | Schwaller et al. | |
| 5,909,550 A * | 6/1999 | Shankar et al. | 709/227 |
| 5,910,803 A * | 6/1999 | Grau et al. | 715/734 |

(Continued)

OTHER PUBLICATIONS

Metzger, P. and Simpson, W. "IP Authentication Using Keyed SHA1 with Interleaved Padding (IP-MAC)," RFC 2841, Nov. 2000, pp. 1-9.*

(Continued)

*Primary Examiner* — Melvin H Pollack

(57) ABSTRACT

A system discovers the topology of devices in a network, such as all of the layer-2 and layer-3 devices, including routers and switches. The devices are mapped, as well as the links that join them. The devices are polled using SNMP requests. Route tables are derived from each router to determine addresses of the devices. A spanning tree process is used to discover layer-2 devices. Connections between layers are then discovered. Where information is incomplete, an undiscovered router cloud is recognized.

45 Claims, 31 Drawing Sheets

(56) References Cited

U.S. PATENT DOCUMENTS

| | | | |
|---|---|---|---|
| 5,926,463 A | 7/1999 | Ahearn et al. | |
| 5,937,165 A | 8/1999 | Schwaller et al. | |
| 5,968,176 A * | 10/1999 | Nessett et al. | 726/11 |
| 5,970,232 A * | 10/1999 | Passint et al. | 709/238 |
| 5,999,178 A * | 12/1999 | Hwang et al. | 715/787 |
| 6,014,380 A * | 1/2000 | Hendel et al. | 370/392 |
| 6,058,429 A * | 5/2000 | Ames et al. | 709/242 |
| 6,061,725 A | 5/2000 | Schwaller et al. | |
| 6,069,895 A * | 5/2000 | Ayandeh | 370/399 |
| 6,091,725 A | 7/2000 | Cheriton et al. | |
| 6,094,678 A * | 7/2000 | Nethercott et al. | 709/220 |
| 6,101,549 A | 8/2000 | Baugher et al. | |
| 6,108,702 A * | 8/2000 | Wood | 709/224 |
| 6,131,117 A * | 10/2000 | Clark et al. | 709/223 |
| 6,167,445 A | 12/2000 | Gai et al. | |
| 6,223,221 B1 | 4/2001 | Kunz | |
| 6,229,540 B1 * | 5/2001 | Tonelli et al. | 715/735 |
| 6,272,150 B1 * | 8/2001 | Hrastar et al. | 370/486 |
| 6,286,047 B1 * | 9/2001 | Ramanathan et al. | 709/224 |
| 6,424,659 B2 * | 7/2002 | Viswanadham et al. | 370/469 |
| 6,430,595 B1 * | 8/2002 | Ferguson et al. | 709/200 |
| 6,434,620 B1 * | 8/2002 | Boucher et al. | 709/230 |
| 6,442,615 B1 | 8/2002 | Nordenstam et al. | |
| 6,577,648 B1 | 6/2003 | Raisanen et al. | |
| 6,597,656 B1 * | 7/2003 | Blanc et al. | 370/219 |
| 6,636,499 B1 * | 10/2003 | Dowling | 370/338 |
| 6,650,646 B1 * | 11/2003 | Galway et al. | 370/397 |
| 6,654,803 B1 | 11/2003 | Rochford et al. | |
| 6,697,338 B1 * | 2/2004 | Breitbart et al. | 370/254 |
| 6,744,739 B2 * | 6/2004 | Martin | 370/254 |
| 6,744,768 B2 | 6/2004 | Vikberg et al. | |
| 6,763,380 B1 * | 7/2004 | Mayton et al. | 709/224 |
| 6,775,268 B1 * | 8/2004 | Wang et al. | 370/352 |
| 6,775,284 B1 * | 8/2004 | Calvignac et al. | 370/392 |
| 6,778,495 B1 * | 8/2004 | Blair | 370/230 |
| 6,778,541 B2 * | 8/2004 | Houston et al. | 370/401 |
| 6,778,596 B1 * | 8/2004 | Tzannes | 375/222 |
| 6,788,686 B1 * | 9/2004 | Khotimsky et al. | 370/394 |
| 6,795,403 B1 * | 9/2004 | Gundavelli | 370/256 |
| 6,798,742 B1 | 9/2004 | Mawhinney et al. | |
| 6,804,712 B1 * | 10/2004 | Kracht | 709/223 |
| 6,807,234 B2 * | 10/2004 | Hansen | 375/259 |
| 6,819,655 B1 | 11/2004 | Gregson | |
| 6,826,613 B1 * | 11/2004 | Wang et al. | 709/227 |
| 6,834,139 B1 * | 12/2004 | Prairie et al. | 385/24 |
| 6,839,346 B1 * | 1/2005 | Kametani | 370/389 |
| 6,839,754 B2 | 1/2005 | Nowak et al. | |
| 6,842,455 B1 * | 1/2005 | Heuer | 370/393 |
| 6,845,105 B1 * | 1/2005 | Olsson et al. | 370/469 |
| 6,847,613 B2 | 1/2005 | Mimura et al. | |
| 6,868,083 B2 * | 3/2005 | Apostolopoulos et al. | 370/392 |
| 6,879,559 B1 * | 4/2005 | Blackmon et al. | 370/225 |
| 6,885,667 B1 * | 4/2005 | Wilson | 370/392 |
| 6,898,183 B1 * | 5/2005 | Garakani | 370/238 |
| 6,901,442 B1 * | 5/2005 | Schwaller et al. | 709/224 |
| 6,907,036 B1 * | 6/2005 | Malalur | 370/382 |
| 6,907,042 B1 * | 6/2005 | Oguchi | 370/412 |
| 6,909,720 B1 * | 6/2005 | Willis | 370/395.52 |
| 6,940,814 B1 * | 9/2005 | Hoffman | 370/235 |
| 6,961,348 B2 * | 11/2005 | Yu | 370/466 |
| 6,965,562 B2 | 11/2005 | Tuomi | |
| 6,975,330 B1 | 12/2005 | Charlton et al. | |
| 6,985,447 B2 * | 1/2006 | Gibson et al. | 370/255 |
| 6,990,108 B2 * | 1/2006 | Karlsson et al. | 370/395.6 |
| 6,993,036 B2 * | 1/2006 | Mizuhara | 370/401 |
| 7,010,604 B1 * | 3/2006 | Munger et al. | 709/227 |
| 7,013,084 B2 * | 3/2006 | Battou et al. | 398/45 |
| 7,020,696 B1 * | 3/2006 | Perry et al. | 709/224 |
| 7,023,851 B2 * | 4/2006 | Chakravorty | 370/392 |
| 7,024,199 B1 * | 4/2006 | Massie et al. | 455/445 |
| 7,024,475 B1 | 4/2006 | Abaye et al. | |
| 7,035,259 B2 * | 4/2006 | Nomura et al. | 370/392 |
| 7,039,014 B1 * | 5/2006 | Krishnamurthy et al. | 370/244 |
| 7,042,880 B1 * | 5/2006 | Voit et al. | 370/395.1 |
| 7,050,404 B1 * | 5/2006 | Devlin | 370/254 |
| 7,051,078 B1 * | 5/2006 | Cheriton | 709/214 |
| 7,054,272 B1 * | 5/2006 | Noel et al. | 370/241 |
| 7,054,304 B2 * | 5/2006 | Wang | 370/352 |
| 7,068,654 B1 * | 6/2006 | Joseph et al. | 370/392 |
| 7,072,346 B2 * | 7/2006 | Hama | 370/395.53 |
| 7,075,932 B2 * | 7/2006 | Matsuhira et al. | 370/395.31 |
| 7,082,133 B1 * | 7/2006 | Lor et al. | 370/392 |
| 7,099,280 B1 | 8/2006 | Shaffer et al. | |
| 7,116,679 B1 * | 10/2006 | Ghahremani | 370/463 |
| 7,120,154 B2 * | 10/2006 | Bavant et al. | 370/395.53 |
| 7,126,944 B2 * | 10/2006 | Rangarajan et al. | 370/389 |
| 7,133,404 B1 * | 11/2006 | Alkhatib et al. | 370/392 |
| 7,139,247 B2 * | 11/2006 | Desai et al. | 370/255 |
| 7,143,159 B1 * | 11/2006 | Grace et al. | 709/224 |
| 7,165,094 B2 * | 1/2007 | Weber et al. | 709/207 |
| 7,184,441 B1 * | 2/2007 | Kadambi et al. | 370/400 |
| 7,185,073 B1 * | 2/2007 | Gai et al. | 709/221 |
| 7,197,548 B1 * | 3/2007 | Ptasinski et al. | 709/223 |
| 7,200,651 B1 * | 4/2007 | Niemi | 709/223 |
| 7,225,271 B1 * | 5/2007 | DiBiasio et al. | 709/240 |
| 7,237,138 B2 * | 6/2007 | Greenwald et al. | 714/4 |
| 7,248,841 B2 * | 7/2007 | Agee et al. | 455/101 |
| 7,254,638 B2 * | 8/2007 | Ullmann et al. | 709/233 |
| 7,266,595 B1 * | 9/2007 | Black et al. | 709/223 |
| 7,269,175 B2 * | 9/2007 | Karlsson et al. | 370/395.6 |
| 7,277,931 B1 | 10/2007 | Booth et al. | |
| 7,293,077 B1 * | 11/2007 | Teo et al. | 709/221 |
| 7,336,648 B1 * | 2/2008 | Sasagawa | 370/351 |
| 7,346,063 B1 * | 3/2008 | Herbst | 370/395.7 |
| 7,383,574 B2 * | 6/2008 | Burrows et al. | 726/13 |
| 7,412,518 B1 * | 8/2008 | Duigou et al. | 709/227 |
| 7,424,012 B2 * | 9/2008 | Tzeng | 370/389 |
| 7,463,633 B2 * | 12/2008 | Endo et al. | 370/395.1 |
| 7,466,703 B1 * | 12/2008 | Arunachalam et al. | 370/392 |
| 7,474,660 B1 * | 1/2009 | Pearce et al. | 370/395.3 |
| 7,480,866 B2 | 1/2009 | Germain et al. | |
| 7,539,134 B1 * | 5/2009 | Bowes | 370/230 |
| 7,539,824 B2 * | 5/2009 | Lolayekar et al. | 711/148 |
| 7,545,820 B2 * | 6/2009 | Duvvury | 370/401 |
| 7,583,665 B1 * | 9/2009 | Duncan et al. | 370/389 |
| 7,844,696 B2 * | 11/2010 | Labovitz et al. | 709/224 |
| 7,886,054 B1 * | 2/2011 | Nag et al. | 709/226 |
| 7,961,758 B2 * | 6/2011 | Perkins et al. | 370/474 |
| 8,001,232 B1 * | 8/2011 | Saulpaugh et al. | 709/224 |
| 2002/0013837 A1 * | 1/2002 | Battat et al. | 709/223 |
| 2002/0080181 A1 | 6/2002 | Razdow et al. | |
| 2002/0101886 A1 | 8/2002 | Jagadeesan | |
| 2002/0105911 A1 | 8/2002 | Pruthi et al. | |
| 2002/0143929 A1 | 10/2002 | Maltz et al. | |
| 2003/0046390 A1 * | 3/2003 | Ball et al. | 709/224 |
| 2003/0072270 A1 * | 4/2003 | Guerin et al. | 370/254 |
| 2003/0093513 A1 * | 5/2003 | Hicks et al. | 709/224 |
| 2004/0114570 A1 | 6/2004 | Vikberg et al. | |
| 2004/0205182 A1 * | 10/2004 | Geddes | 709/223 |
| 2006/0069779 A1 | 3/2006 | Sundqvist et al. | |
| 2006/0129672 A1 * | 6/2006 | Mayer | 709/223 |
| 2007/0140134 A1 | 6/2007 | Clark | |
| 2009/0216881 A1 * | 8/2009 | Lovy et al. | 709/224 |

OTHER PUBLICATIONS

Bates, T. et al. "Multiprotocol Extensions for BGP-4," RFC 2858, Jun. 2000, pp. 1-11.*

Grossman, D. and Heinanen, J. "Multiprotocol Encapsulation over ATM Adaptation Layer 5," RFC 2684, Sep. 1999, pp. 1-23.*

Luciani, J. et al. "NBMA Next Hop Resolution Protocol (NHRP)," RFC 2332, Apr. 1998, pp. 1-52.*

Suihkonen, Olli Mikko. "MPLS Control Architecture in a Multipurpose Switch," Masters Thesis, Department of Information Technology, Lappeenranta University of Technology, Nov. 24, 2000, pp. 1-85.*

Chao, H.J. Ti-Shiang Wang. "An Optical Interconnection Network for Terabit IP Routers," Journal of Lightwave Technology, vol. 18, Issue 12, Dec. 2000, pp. 2095-2112.*

Dumortier, P. "Toward a New IP over ATM Routing Paradigm," IEEE Communications Magazine, vol. 36, Issue 1, Jan. 1998, pp. 82-86.*

Saxena, P. and Liu, C.L. "A Performance-Driven Layer Assignment Algorithm for Multiple Interconnect Trees," IEEE/ACM International Conference on Computer-Aided Design (ICCAD), Nov. 12, 1998, pp. 124-127.*

Wu, Kai et al. "Dynamic Configuration of Virtual Topology Through Joint Operation of Packet-Routing and Wavelength-Routing Network," Proceedings of SPIE Optical Interconnects for Telecommunication and Data Communications, vol. 4225, Oct. 2000, pp. 181-185.*

Xiao, Xipeng et al. "An Overview of IP Switching and Tag Switching," International Conference on Parallel and Distributed Systems, Dec. 13, 1997, pp. 669-675.*

By Robert Martin, "NetIQ's Chariot Hits Major League Testing Status"; Cisco World Print, Dec. 2000 Issue.

Author Unknown, "Using Cisco CallManager Trace Gathering Tool for Diagnostic Traces" Cisco Systems, Inc.; Posted: May 4, 2001 (from the Internet, Cisco Web site).

Author Unknown, "Chariot Evaluates the Performance Impact of Network Changes" CHAR-03-0401—NetIQ Corp.; date unknown.

Author Unknown, "Chariot Voice Over IP (VoIP) Module Predicts Whether Your Network can Handle VoIP and Ensure a Successful Deployment"; CHVO-01-0401, NetIQ Corp.; date unknown.

Author Unknown, "A World of Network Teset Solutions"—Qpro The Performer, DS-PA-Qpro Revision B, RADCOM; Apr. 2001.

Author Unknown, "Managing the Performance of Networked Applications" NPSS-02-0401, NetIQ Corporation, date unknown.

Author Unknown, "Checklist of VoIP Network Design Tips"—NetIQ Corporation, 2001.

By Daniel J. McCullough and John Q. Walker, "Interested in VoIP? How to Proceed"—NetIQ Corporation, date unknown.

By John Q. Walker and Jeff Hicks, "Using Chariots ® to Evaluate Data Networks for VoIP Readiness"—NetIQ Corporation, 2001.

By Mike Avery, "VitalSuite Offers Strong Solution" from Network Management Packages, INFOWORLD, Jan. 24, 2000.

Author Unknown, "Chariot Voice Over IP Module"—NetIQ Corporation, (Internet Web site) date unknown.

By Eric Hammond, "Web Meets Telephone" InfoWorld Test Center Realiable Solutions for Business, Jul. 30, 2001.

By Danielle Dunne, "What is VoIP" Learning Curve—Technology Made Simple; CXO Media Inc., Feb. 28, 2001.

Author Unknown, "NetIQ Announces New Products to Streamline the Deployment and Management of Voice Over IP" News/Events 2001 Press Releases, NetIQ Corporation.

Author Unknown, Products Network Performance Products Chariot, NetIQ Corporation (Internet Web Site), dated unknown.

Author Unknown, Cisco Announces IP Telephony Services Designation within the Cisco Powered Network Program, Intuit Inc., updated Jul. 2, 2001.

Author Unknown, Network Test Solutions Qpro—View Data Sheet in PDF Format, RADCOM Inc. (Internet Web site) date unknown.

By Roderick Beck, "Do-It-Yourself QoS Measurement" QoS & OSS, Aug. 2001 Special Report.

By Stefan Pracht and Dennis Hardman, "Voice Quality in Converging Telephone and IP Network" Cisco World Magazine, Jan. 2001.

Discovering Internet Topology, (http://www.cs.cornell.edu/skeshav/papers/discovery.pdf), Cornell University, Ithaca, NY, Jul. 1998 by Keshav et al., 16 pages.

Final Office Action on U.S. Appl. No 10/270,011, mailed Sep. 13, 2011.

Non-Final Office Action on U.S. Appl. No. 10/270,122, mailed Jan. 27, 2009.

Non-Final Office Action on U.S. Appl. No. 10/270,122, mailed Apr. 4, 2007.

Non-Final Office Action on U.S. Appl. No. 10/270,011, mailed Mar. 30, 2011.

Non-Final Office Action on U.S. Appl. No. 10/270,011, mailed Jul. 20, 2010.

Non-Final Office Action on U.S. Appl. No. 10/270,122, mailed Mar. 10, 2008.

Notice of Allowance on U.S. Appl. No. 10/270,122, mailed Jun. 26, 2009.

\* cited by examiner

NETWORK TOPOLOGY DISCOVERY SYSTEMS AND METHODS

RELATED APPLICATIONS

The present application is related to concurrently filed non-provisional applications:
 (i) Network Traffic Generation and Monitoring Systems and Methods and their Use in Testing Frameworks Determining Suitability of a Network for Target Applications; and
 (ii) Report Generation and Visualization Systems and Methods and their Use in Testing Frameworks Determining Suitability of a Network for Target Applications, which concurrently filed applications are assigned to the assignee of the present application.

The present application claims priority based on provisional application No. 60/329,569 filed Oct. 15, 2001.

These related applications are hereby incorporated by reference in the present application as if set forth in their entirety herein.

FIELD OF THE INVENTION

The present invention relates to techniques for data network topology discovery, data network monitoring and analysis, and for reporting, display and visualization of such data network topology, analysis and monitoring. More particularly, the present invention relates to topology discovery, analysis, monitoring and reporting, display and visualization of operations in data networks using protocols such as the Internet Protocol (IP) for Voice over IP (VoIP) and other (e.g., multimedia) network applications, and for configuring and provisioning IP networks for such applications.

BACKGROUND OF THE INVENTION

Packet switched networks typically include a plurality of network devices (e.g., end user terminals, computers, routers and switches) interconnected by transmission links. Such networks are commonly used today for data-oriented applications such as delivering email and web content. Multimedia and real-time applications (e.g., streaming audio, video on demand, and voice applications) running on the same packet switched network, though less common than the data-oriented applications, are gaining acceptance. Packet switched networks are different from the circuit switched networks that have traditionally been used for telephone communication. In a circuit switched network a pair of endpoints communicate by establishing a connection, which behaves as if endpoints are connected to the same wire. In packet switched networks, however, many participants compete for the same network resources (i.e., routers, switches, and links).

The well-known ISO-OSI seven-layer reference model (International Standards Organization-Open Systems Interconnect) was developed to help describe computer networks. Two important layers of this model are used throughout this document. Layer 2, the data-link layer, refers to communication within a LAN, such as what Ethernet provides. Layer 3, the network layer, refers to networks that may span multiple LANs, such as the Internet Protocol (IP).

We can think of devices that operate primarily at layer 2 as layer-2 devices. For example, the primary function of an Ethernet switch is to forward Ethernet traffic in units called frames to the port on the path towards the destination device. Thus, a switch is considered a layer-2 device. It should be noted that switches often have management agents that operate at layer 7 (the application layer) and require a layer-3 component to communicate with the management station. Despite having a component that operates at layer 3, a switch is still considered a layer-2 device because its primary function (namely forwarding Ethernet frames) is applied at layer 2.

Similarly, layer-3 devices are those devices that operate primarily at layer 3. An example of a layer-3 device is an IP router. The primary function of such a device is to process IP packets and forward them to the interface towards the destination. Routers require hardware that creates a layer-2 (and layer-1, the physical layer) frame to send the packet to the neighboring device. Despite the existence of such hardware, the router is considered a layer-3 device because the primary function is to process layer-3 packets.

A recent trend has been to combine functionality of a switch and a router in a single box. Such devices, called layer-3 switches, have characteristics of both layer-2 and layer-3 devices. A layer-3 switch can be treated as two separate devices, a layer-2 switch and a layer-3 router, connected by its internal backbone bus.

A subnet is an important concept in a network, such as an IP network. A subnet can be defined as a set of network addresses (or the devices using those addresses) that can communicate directly at layer-3. That is, the physical path between the addresses may contain any number of layer-2 devices (such as switches), but no other layer-3 devices. A router is a device that sends traffic between subnets.

Subnets can also be defined in terms of IP addresses. An IP address consists of 32 bits (or 4 octets, represented as the decimal value of each octet separated by periods). The example IP address, 192.168.3.106, corresponds to the binary representation shown in the first row of Table 1.

An IP address can be divided into two parts: the subnet address and host address, where the first (most significant) N bits of the address are the subnet address and the remaining bits are the host address. All addresses belonging to the same subnet have the same subnet address, and hosts within the subnet have a different host address. Thus, a subnet can be defined as the combination of a subnet address and N, the number of significant bits used in the subnet address. It is convenient to constrict a subnet mask (or network mask) as a bit field where the first bits N are set to one and the remaining bits are set to zero. For example, similar to the IP address representation, a subnet mask of 23 bits is equivalent to 255.255.254.0. Thus, an address belongs to a subnet if and only if the result of applying the network mask to the address (i.e., the logical AND operation is applied between the binary representations of the address and the mask) is equal to the subnet address.

An important address in an IP subnet is the broadcast address. Packets sent to the broadcast address are sent to every host in the subnet. The broadcast address is, by definition, the address in the subnet with the largest possible host address (i.e., every bit in the host address is set to 1). Table 1 shows an IP address, subnet mask, subnet address, host address, and broadcast address for the example host and subnet.

TABLE 1

Subnet Address Example

| | Dotted Decimal | Binary |
|---|---|---|
| IP Address | 192.168.3.106 | 11000000 10101000 00000011 01101010 |
| Subnet Mask | 255.255.254.0 | 11111111 11111111 11111110 00000000 |

TABLE 1-continued

Subnet Address Example

| | Dotted Decimal | Binary |
|---|---|---|
| Subnet Address | 192.168.2.0 | 11000000 10101000 00000010 00000000 |
| Host Address | 0.0.1.106 | 00000000 00000000 00000001 01101010 |
| Broadcast Address | 192.168.3.255 | 11000000 10101000 00000011 11111111 |

Not long ago, the standard network layout used a separate switched network for each department and geographical location (e.g., a floor and wing of a building) and several layer-3 routers between the switched networks. The recent popularity of Virtual LANs (VLANs) has resulted in an increase in the size of fast switched networks and a decrease in the dependency of routers. Today, it is common to use a single switched network for an entire building or campus with a single edge-router for each switched network. This shift underscores the importance of the layer-2 topology in enterprise networks.

FIG. 1 shows an example of a simple layer-3 network. The network consists of three hosts (H1, H17, and H19), three routers (R3, R7, and R11), one firewall (FW20), three subnets (N2, N16, and N18), the addresses used on the routers (e.g., A4, A9, A10) and several communication links (shown as lines connecting network elements). The figure also shows the route tables for each of the routers. The route tables each have three columns (Subnet, Address, and Type). A route table is indexed by the Subnet field-that is, when the router needs to lookup a route in its route table for a packet, it finds the entry whose Subnet field contains the destination address in the packet header. The second column, address is either (1) the address of the next router along the path toward the destination, or (2) the address belonging the router itself on the same subnet as the destination, if it is the last router along the path. The third column indicates which type of address is used-specifically, the type is indirect if the address belongs to a neighboring router and direct if the subnet is directly connected to the router. Note that some direct route entries have been omitted to simplify the example.

To illustrate an example of how routers operate, consider the case where H1 sends a message to H19. Each host is configured to send traffic to its nearest router, called its default router (or default gateway); in this case, H1's default router is R3. Every device (host, router, etc.) is only allowed to send packets to devices on the same subnet; to send packets to devices on other subnets, the packet must go to a router. In this case, H1 needs to send the packet to its default router, R3, because H1 is on N2 and H19 is on N18. Upon receiving the packet, R3 looks up the destination address, H19 in its route table. It finds that H19 belongs to subnet N18, corresponding to the third entry. Based on that route entry, R3 sends the packet toward A8, which belongs to R7. When R7 looks up the destination address, H19, in its route table, it finds that the destination belongs to a subnet, N18, that is directly connected to the router. Thus, R7 can send the packet directly to H19.

When a router encounters a packet whose destination address does not match any entry its route table, it sends the packet to the default address. For example, in FIG. 1, the route table of R7 does contain no entry for subnet N16. If R7 receives a packet destined for N16, it sends the packet to A12 by default.

Informally, the path between a pair of devices in a network consists of the intermediate devices and links traversed by the packets sent between the pair. In the example above, routers R3 and R7 are on the path from H1 to H19.

FIG. 2 shows an example of a layer-2 network based on subnet N2 of FIG. 1. It consists of four hosts (H1, H20, H21, and H22), one router (R3), four switches (S30-S33), the ports on the switches (I60-I72), and several communication links (shown as lines connecting network elements). The figure also shows the Forward Table for each switch. The Forward Table has two columns, address and port, which map the address to the port along the path toward the host using the address.

As an example of how typical switches operate, consider the first hop of the path from H1 to H19 above; the first layer-3 hop is from H1 to R3 on subnet N2. First, H1 sends the frame using R3 (more precisely, R3's physical address) as the destination address on H1's only link (i.e., to I60 on S30). Upon receiving the frame, S30 looks up the destination address, R3, in its Forward Table, which indicates that I61 should be used to get to the destination. Thus, S30 sends the frame through I61, which connects to I63 on S31. Next, S31 sends the frame out to I64 as indicated in its Forward Table entry for R3. The frame then arrives at S32, whose Forward Table's entry indicates that S32 should forward the frame on port I67. Finally, the frame arrives at R3 because the router is connected to I67. It should be noted that other switched layer-2 network technologies (e.g., asynchronous transfer mode (ATM), token ring) operate differently, but still fit into this framework.

As data traverses a network, each packet experiences delay at each of the network devices and links along the path. Delays at devices are based primarily on the state of switches and routers at the time packets are presented (e.g., if the router has a long queue, the packet may sit at the router until all the data ahead of it in the queue is transmitted). Delays due to the links are fixed and depend on (1) the time to send the signal over long distances and (2) the bandwidth of the link (i.e., the maximum transfer rate). Similarly, each packet is subject to being discarded along the path for a variety of reasons, including transmission errors (e.g., due to line noise) and the state of network devices (e.g., a full queue).

Emerging applications for use on present and proposed future data networks include so-called Voice Over IP (VoIP) applications-and other multimedia applications—that permit data networks carrying computer and other traditional forms of data to also carry coded voice signals using standard Internet Protocol (or other data protocol) techniques. VoIP applications are those for which voice communications are carried over an IP network for at least some of their transit between one or more calling stations and one or more called stations. Though VoIP applications promise increased network efficiencies and lowered cost for voice calls, use of such VoIP applications has thus far been relatively limited because existing and proposed networks are characterized by performance characteristics, including packet loss and packet delay, which, while tolerable for most data applications, give rise to user-perceived impairments that compare unfavorably with traditional voice communications—e.g., over the public switched telephone network (PSTN). See, for example, a paper by S. Pracht and D. Hardman, entitled *Voice Quality in Converged Telephony and IP Networks*, January 2001, available from Cisco World magazine.

Recent industry trends show that delivery of multimedia content over data networks has many benefits for a wide range of applications. A significant challenge to the widespread use of such multimedia applications is ensuring the availability of a minimum quality of service (QoS), especially in networks using IP, a protocol that generally provides only best effort delivery of packets. IP does have a notion of Type of Service (TOS) that allows hosts to classify their traffic for different QoS properties (see also DiffServ, below), but this mechanism is seldom utilized in practice.

VoIP applications constitute a further challenge for data networks since they involve delivery of voice and data content, each having different QoS requirements and sensitivities. While applications delivering voice packets are especially sensitive to delay, jitter, and packet loss, many data application will perform satisfactorily under the same conditions of delay or jitter. For example, in transferring a large file, the user is only concerned with the total time to send the file (e.g., it is acceptable to have periods where no data is sent so long as the total time to transfer the entire file is not affected). It is not acceptable, however, for voice traffic to be silent for seconds while the speaker is trying to talk. Hence, a data network that performs satisfactorily for some applications does not necessarily lend itself to a successful VoIP implementation.

Prior art on discovering layer-3 topology includes academic papers and tools. Several papers have been published that automatically discover a map of the layer-3 topology but provide limited information about paths between devices in the network. One paper (R. Siamwalla, R. Sharma, and S. Keshav, "Discovering Internet topology," 1999) presents and compares ping-, traceroute-, and Domain Name Service (DNS)-based techniques to obtain the layer-3 topology. Ping is a protocol where one host sends a particular Internet Control Message Protocol (ICMP) message (an echo request) to another host, which in turn replies with another ICMP message (an echo reply). Traceroute is a program that traces the sequence of routers along a path. It does so by sending an IP packet with a small value in the Time To Live (TTL) field in the IP header. Each router decrements the TTL field by one and it is required to send an ICMP to the sender if the TTL value reaches 0. Traceroute uses the source address of the ICMP packet to determine which router is N hops away (where N is the value set in the TTL field). By repeating this process for various values of TTL (e.g., starting with 0 and counting up until it reaches the destination address), it learns of all the routers along the path.

Other examples of prior network topology discovery at layer 3 are described in, for example, B. Huffaker, M. Fomenkov, D. Moore, and k. C. claffy, "Macroscopic Analyses of the Infrastructure: Measurement and Visualization of Internet Connectivity and Performance," in *Proc. of PAM2001—A Workshop on Passive and Active Measurements*, (Amsterdam, Netherlands), Apr. 23-24, 2001; R. Govindan and H. Tangmunarunkit, "Heuristics for Internet Map Discovery," in *Proc. of the 2000 IEEE Computer and Communications Societies Conf. on Computer Communications* (INFOCOM-00), (Los Alamitos, Calif.), IEEE, Mar. 26-30, 2000; H. Burch and B. Cheswick, "Mapping the Internet," *IEEE Computer*, vol. 32, pp. 97-98, April 1999. These papers mainly focus on mapping the topology of the Internet backbone rather than that of an enterprise network.

Among the tools that discover layer-3 topology, Skitter, dynamically discovers and displays the Internet topology as well as performance measurements. Skitter uses a variation of traceroute which sends ICMP probe instead of User Datagram Protocol (UDP) probes. Each probe runs from a set of geographically distributed servers. Skitter has several different views of the topology based on IP address, IP connectivity, geographic location, and performance. It does not attempt, however, to find paths between arbitrary endpoints. Another tool, Mercator, adds a technique to identify where IP addresses from separate paths belong to the same router. It finds paths from a single centralized location. Finally, another tool mapped nearly 100,000 networks in an attempt to visualize the interconnections in the Internet. Their approach used a combination of Border Gateway Protocol (BGP) routing tables, which can be obtained directly from routers, and traceroute. See, for example, Y. Rekhter and T. Li, "A Border Gateway Protocol 4 (BGP-4)," March 1995, RFC 1771.

Simple Network Management Protocol (SNMP) is an industry standard protocol for communicating management information to and from devices on a network (e.g., routers, switches, printers, etc.). See, for example, J. Case, M. Fedor, M. Schoffstall, and J. Davin, "A Simple Network Management Protocol (SNMP)," May 1990, RFC 1157 or W. Stallings, *SNMP, SNMPv2, SNMPv3, and RMON* 1 *and* 2. Reading, Mass.: Addison-Wesley, 3rd ed., January 1999.

Nearly all new network-attached products for sale to businesses include an SNMP agent (i.e., a software module on the devices for processing SNMP requests). SNMP is a lightweight protocol that allows SNMP clients (e.g., a management tool) to obtain information from or configure devices with an SNMP agent. The meaning of the information that SNMP carries is specified by the Management Information Base (MIB). See, for example, M. Rose and K. McCloghrie, "Concise MIB Definitions," March 1991, RFC 1212; K. McCloghrie and M. Rose, "Management Information Base for Network Management of TCP/IP-Based Internets: MIB-II," March 1991, RFC 1213. MIBs are organized in a hierarchical tree where different organizations own separate branches of the tree. For example, the MIB-II branch is controlled by the Internet Engineering Task Force (IETF), a standard body, and any company can have its own branch under the enterprises node.

SNMP-based approaches for discovering layer-3 devices have been demonstrated in commercial tools. For example, SolarWinds, a network management tool, includes a component for discovering devices on the network using ping, DNS queries, and SNMP queries. The topology discovery process performs a breadth first search from a seed router to the routers given in another router's route table.

Previous SNMP-based approaches to find the layer-3 path between arbitrary hosts have been demonstrated to work when SNMP is available on all intermediate routers and the IP address of the first router is known. One such approach is described in D. Zeltserman and B. Puoplo, *Building Network Management Tools with Tcl/Tk*, Upper Saddle River, N.J.: Prentice Hall, January 1998. It starts from a given router, finds the routing entry towards the destination, uses its next-hop address field to find the next router, and iterates until the destination is reached. This approach fails when any router in the path is inaccessible. Because the routing information is collected at run-time it has the advantage that the routes are current. But, such an approach is inefficient for finding several routers at once because some route tables take a long time to retrieve (we have observed some that take as long as 15 minutes to retrieve). The authors suggest a certain improvement such that each hop can be reduced to 33 or fewer lookups by utilizing the table index to check the destination address applying each possible netmask until a suitable entry is found.

A few commercial tools offer products claiming to provide layer-3 topology discovery. A few well-known examples include HP OpenView 6.2, Computer Associates Unicenter Network and Systems Management 3.0, and IBM's Tivoli. Since the approaches used by each tool are proprietary, the details of each tool cannot be presented here. Only a few tools claim to provide information about layer-3 paths in a network. For example, see Peregrine Systems, Inc., "InfraTools Network Discovery,"; Cisco, "CiscoWorks2000,".

Limited literature is available on layer-2 topology discovery. An approach to generate the layer-2 topology between switches was presented in a paper, Y. Breitbart, et al., "Topology discovery in heterogeneous IP networks," in *Proc. of the 2000 IEEE Computer and Communications Societies Conf. on Computer Communications* (INFOCOM-00), (Los Alamitos, Calif.), pp. 265-274, Mar. 26-30, 2000 and improved upon in another, B. Lowekamp, D. R. O'Hallaron, and T. R. Gross, "Topology Discovery for Large Ethernet Networks," in *ACM SIGCOMM* 2001, (San Diego, Calif.), pp. 237-248, Aug. 27-31, 2001. This approach operates by processing the forwarding tables obtained from each switch via SNMP.

Some switch vendors have produced commercial tools that use proprietary MIB extensions to generate the layer-2 topology in a network consisting only of their products. See, for example, Hewlett-Packard Co., *HP Toptools 5.5 User Guide*, 2001. A few commercial tools have recently added claims to provide layer-2 topology discovery in heterogeneous networks. The techniques used by these tools are proprietary. See, for example, Peregrine (as above) and Hewlett-Packard Co., "Discovering and Mapping Level 2 Devices."

The prior work presented above for layer-2 topology discovery has certain limitations. Only one other approach finds a path between arbitrary hosts, but: (a) it cannot automatically obtain the first router in a path, (b) the path stops at the first non-SNMP-enabled device in the path, and (c) the path analysis is done on the live network, which is inefficient when a large number of paths are needed. The layer-2 topology algorithms described above perform poorly (e.g., can fail to produce any correct links) when a single forward entry is missing or incorrect. Furthermore, the approaches have not been demonstrated to work on networks using VLANs. No previous techniques have been presented to relate or to combine layer-2 and layer-3 paths.

Several mechanisms are currently available to manage the allocation of network resources among network users in efforts to optimize QoS in the network. In one example, an emerging Differentiated Services (DiffServ) approach allows a communications provider or a network user to mark packets with different settings to associate them with different grades of network service. See, for example, S. Blake et al, *IETF RFC* 2475, "An Architecture for Differentiated Services," December 1998; and W. Stallings, "Differentiated Services," *Communications Systems Design*, vol. 6, no. 2, February 2000. Such differentiated services allow the network to allocate network resources among classes of packets and, ultimately, among network users. In addition, some devices permit control over the rate that traffic is sent across portions of the network, thus permitting communications providers to control the offered load applied to a network.

Two simple techniques for network management, ping and traceroute, are described above. Ping can be used to determine if a network end station can be reached and is operational. Traceroute techniques can determine the layer-3 hop-by-hop path and round-trip time to a network end station. Other proposed techniques actively probe a network by transmitting additional packets into the network and measuring the end-to-end delay and packet loss rate across these networks.

These approaches suffer several shortcomings when applied to large-scale network performance management. First, ping can only test a connection from a testing point to a remote location. To test paths between network ingress and egress points, a network operator must perform ping operations between all edges of the network of the network. While traceroute can determine the path being taken by packets across the network, it cannot distinguish between packet loss and non-responding systems such as firewalls and the like. Likewise, it can only compute the round-trip delay (including system's processing delay).

Prior attempts to identify data networks that are suitable for VoIP applications and techniques for optimizing existing networks for VoIP applications have included those used with networks carrying traditional data applications. However, such prior test and measurement techniques often suffer from limitations in recognizing network characteristics that prove of great importance to voice users. Thus, as noted above, suitable packet delay characteristics (as well as jitter and packet loss) prove to be of special importance in successful implementation of VoIP applications. Moreover, most voice traffic over data networks (as in traditional voice networks) involves two-way communications (or more, e.g., for multi-party conferencing) over respective data links, with delay in each link being important to perceived call quality.

Because many present and proposed VoIP applications are intended for use over private corporate, government or other institutional networks, and because such networks are also required to carry a variety of other traffic, at least some of which has an assigned priority, it often proves necessary to design and operate networks to be used for VoIP applications with such priorities clearly in mind. Thus, it is important to measure existing and proposed traffic flows in view of such priorities and in view of inherent requirements of VoIP applications.

Because many corporate and other private networks include a large number of operational nodes (computers, user data terminals, voice terminals, routers, switches, etc.) each interconnected with one or more other nodes over a variety of data links, the complexity of such networks often poses severe planning and operational difficulties. Such difficulties are compounded by the variability of traffic, including VoIP traffic, especially in times of network overload or failure. Increases in steady state and peak traffic demands, and newly emerging traffic patterns or actual or potential performance bottlenecks are often difficult to anticipate or quickly recognize using present network monitoring techniques.

Traffic matrices between sources and destinations in the network are often used for tracking network traffic patterns. A traffic matrix has the source as one axis, the destination as the second axis, and a measure of traffic during some interval of time (e.g., packets per second or bytes per second) as the entry in the matrix. Using a set of such matrices from a set of appropriate intervals, a communications provider can track trends in load offered to its network, thus providing a basic tool for network engineering. One existing network monitoring system measures offered packet load and can record information to create a traffic matrix, but cannot track actual network performance. This system tracks sequences of packets between source and destination addresses as a router processes them and reports this information to a central system. By combining such records from several packet switches, it is possible to compute the number of packets and the number of bytes of packet traffic between ingress and egress points of a network. This tool, however, does not provide a means for computing network loss or delay during specific intervals, nor does it provide means for sectionalizing such performance metrics.

A network testing tool known as Chariot marketed by NetIQ Corp. provides predictive information relating to impact of introducing a new application on a data network. This and other products of NetIQ are described generally in their publication *Managing the Performance of Networked*

*Applications.* General descriptive materials are also available at that web site relating to a Chariot Voice over IP module available from NetIQ.

Commercial tools for network performance monitoring and management currently available include Hewlett-Packard's HP Openview, Lucent's VirtualSuite, Patrol Dash-Board, described at bmcsoftware, "PATROL DashBoard," Omegon's NetAlly described in "NetAlly White Paper," the Felix project from Telcordia Technologies described in C. Huitema and M. W. Garrett, "Project Felix: Independent monitoring for network survivability," and open source MRTG. Such commercial tools provide detailed network statistics, but are limited in their ability to export the data to other tools for cooperative analysis purposes.

Tools for testing performance of multimedia applications (specifically, VoIP) include the above-cited NetAlly and Chariot tools, as well as Hammer described in Empirix, "Test and Monitoring Solutions for Web, Voice, and Network Applications,"; and VoIP *Explorer*,. While these tools differ in the way they inject voice traffic, they collect similar end-to-end measurements including delay, jitter, and packet loss.

Other tools that provide some testing functionality for assessing networks for possible VoIP applications include those from Agilent Technologies. Agilent Technologies's suite of tools includes three main components: Voice Quality Tester (VQT), IP Telephony Analyzer, and IP Telephony Reporter. Voice Quality Tester measures voice quality objectively, without having human listeners. This system supports one-way and round-trip delay measurements, echo, and clarity (a measure of voice quality). IP Telephony Analyzer captures RTP packets and calculates various performance metrics, such as packet loss, delay, and jitter for each RTP stream. Additionally, for each connection and protocol, it collects statistics on the number of frames, bytes, and frame errors, and the utilization. IP Telephony Reporter merges the call quality statistics provided by VQT and the packet network statistics provided by the IP Telephony Analyzer by importing result files from both of the components. Agilent's suite measures the impact of IP telephony equipment on voice quality rather than the impact of the data network on quality.

Cisco Systems provides a solution described in "Cisco VoIP Readiness Net Audit," that uses proprietary SNMP-based tools for data collection from network devices. The goal of this solution is to assess the general health of the network. The service focuses on performance analysis of routers and switches and delivers an executive report describing the overall network performance and VoIP readiness. It does not integrate voice quality statistics with network device statistics.

Each of the prior tools mentioned above proves useful in particular circumstances to provide a part of the required set of tools required to assess a network for multimedia application readiness. None of these prior tools, however, fully integrates voice quality metrics with statistics for network devices on the voice path to the degree desired for the multimedia applications of current and future importance. Moreover making selections from the variety of existing tools to accomplish the desired high degree of integration is non-trivial since each tool has different interfaces, data formats, and limited data import/export support. Another major obstacle for integration of disparate tools is that the granularity of time measurements tends to be different for each tool. Few commercial tools provide fine time granularity measurements (i.e., monitoring on the order of seconds). Furthermore, most of these tools require the use of a graphical user interface (GUI), which would require extensive manual intervention to compose sophisticated tests.

Thus, above-cited prior art techniques, while useful in particular circumstances, suffer from one or more limitations relating to completeness of monitoring or analysis of network entity performance, integration between network measurement, analysis and visualization, or in ease of use in connection with a variety of multimedia and other non-traditional applications.

SUMMARY OF THE INVENTION

The invention described in this document overcomes the limitations of prior art for the purpose of evaluating a network to determine its suitability for target applications. Evaluation techniques based only on measuring the end-to-end QoS incurred by a target application treat the network as a black box and cannot provide performance diagnosis at the network level. Similarly, techniques based only on measuring the network utilization cannot estimate the end-to-end QoS for the target application. The invention overcomes the shortcomings of both techniques by first determining the network topology and then collecting simultaneous end-to-end QoS and network utilization measurements that can be integrated at the network level. This approach, by tracing the paths of application traffic in order to integrate the utilization of network devices on a path with the QoS incurred by the traffic across the path, allows diagnosing QoS problems to reveal network devices that are the sources for QoS problems.

In accordance with one aspect of embodiments of the present invention, quality of service (QoS) in a network is evaluated from the perspective of whether VoIP implementations on a given network will perform satisfactorily. More particularly, one illustrative embodiment comprises a framework providing a suite of tools for evaluating a network prior to the installation of voice equipment and applications on that network. Using these tools, network managers can more effectively make decisions regarding design and implementation of VoIP features and services in target networks.

Illustrative embodiments of the present inventive framework advantageously comprise some or all of these phases: Topology Discovery, Network Device Monitoring, Call Synthesis & Call Quality Monitoring, and Analysis. Though readily finding use in IP networks for voice applications, frameworks in accordance with illustrative embodiments of the present invention are readily generalized for application to other applications with stringent QoS requirements such as multimedia applications and to other than IP networks.

In accordance with the present invention, the exact arrangement of the devices in the network is discovered and mapped so that the entire topology of the network is known. In discovering and mapping the layer-2 and -3 devices, the user is better able to determine the capabilities of the network. The path of voice traffic between a pair of endpoints is also determined. Thus, data collected on each network device or port on search device can be related to the path through the network taken by voice packets. Furthermore, it provides a framework for further measurement and analysis of the data to be generated.

In accordance with practice of illustrative embodiments of the present invention, VoIP QoS metrics are applied to the network elements by injecting voice traffic into the network and measuring end-to-end quality of service for this traffic, illustratively from the perspective of each endpoint. It also proves advantageous in illustrative embodiments of the present invention to monitor load and utilization of network elements routing voice packets. Such monitoring and QoS measurements for injected voice traffic yield QoS results as a function of use and load on the network elements that are on call paths. More specifically, it proves advantageous in accordance with an aspect of the present invention to relate network load on call paths to voice quality parameters to identify problems in the network that are likely to prevent an acceptable VoIP implementation.

It proves advantageous in use of present inventive network tools to employ synthesized network traffic while making actual end-to-end QoS measurements. Such traffic injection and measurements are performed under a variety of network conditions, including conditions of peak network loading.

In accordance with the present invention, end-to-end measurements, network utilization measurements, and network topology data are analyzed and displayed in an intuitive visual format in order for the operator to have a better understanding of the problem areas in the network and to better determine if the network is capable of VoIP implementation. Various graphs and tables can be displayed including a display of the network over time to show a movie of how the problems developed. Parts of the network can be color coded to indicate problem areas as well as areas that function properly.

In application of tools in present inventive frameworks, illustrative embodiments automatically discover the topology of a target network, collect and integrate network element status and VoIP statistics (including voice quality metrics) in evaluating network performance and identifying actual or potential network problems.

BRIEF DESCRIPTION OF THE DRAWING

The above-summarized invention will be more fully understood upon consideration of the following detailed description and the attached drawings wherein.

DETAILED DESCRIPTION

The following detailed description and accompanying drawing figures depict illustrative embodiments of the present invention. Those skilled in the art will discern alternative system and method embodiments within the spirit of the present invention, and within the scope of the attached claims, from consideration of the present inventive teachings.

A. Notation

It proves convenient to represent an illustrative network topology using a graph G=(D, L), where the nodes of the graph, D, are a set of devices and the edges of the graph, L, are a set of links. A device of type router or switch is considered a switching device. Let $D_i$ and $D_j$ be two devices in D where $1 \leq i, j \leq |D|$, $i \neq j$. There is an edge between device $D_i$ and $D_j$ if and only if there is a direct communications path between $D_i$ and $D_j$. $I_{i,j}$ denotes the jth interface of device $D_i$. Each edge out of a node (device) in the graph represents an interface in the network.

Figure 3:
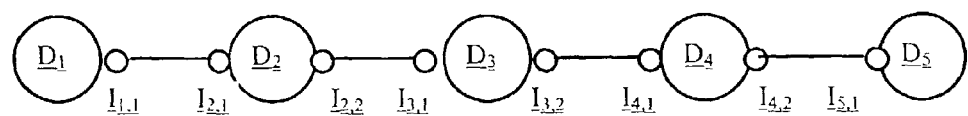
FIG. 3 is a diagram showing network devices involved in a traffic flow representing the target application.

FIG. 3 illustrates the network devices involved in a sample voice call between end-points $D_1$ and $D_5$, where endpoint refers to a device that can initiate and respond to voice calls. We assume that the path from $D_1$ to $D_5$ is the reverse of the path from $D_5$ to $D_1$; a line between two devices denotes a bi-directional edge. Voice packets illustratively pass through three switching devices in FIG. 3, identified as $D_2$, $D_3$, and $D_4$. The interfaces that the packets traverse are also marked on the figure. All network devices that participate in a voice call form the call path. For the illustrative case shown in FIG. 3, the call path comprises $D_1, I_{1,1}, I_{2,1}, D_2, I_{2,2}, I_{3,1}, D_3, I_{3,2}, I_{4,1}, D_4, I_{4,2}, I_{5,1}, D_5$.

It often makes sense to look at the topology or path at a particular network layer. For example, the layer-3 topology is the topology consisting of layer-3 devices and links between them. The layer-2 topology is the topology consisting of layer-2 devices and links between them (e.g., Ethernet links between switches). A layer-3 path between two layer-3 devices is the path containing only layer-3 devices (e.g., hosts and routers) and only layer-3 links (i.e., a direct communication link at layer-3, which may involve a number of switches). The layer-2 path is the path containing only layer-2 devices between network devices that are directly connected at layer 3 (i.e., there is no layer-3 device in the path between the hosts). We are sometimes interested in the set of interfaces used along a path, but uninterested in the network layer of each. Such a path is called the multi-layer path. It is constructed by interleaving the layer-3 path with the layer-2 path on each layer-3 hop. In general, a hop is a unit of a path involving a single link. Note that we assume that paths between devices are static.

As noted above, objective, measurable metrics useful in quantifying quality of IP telephony calls include end-to-end delay, jitter, packet loss and packet loss burst. End-to-end delay from a source to a destination refers to the difference between the time the source sends the first bit of a packet to a destination and the time the destination receives the last bit of that packet. Jitter refers to variation in delay, illustratively the running average of the differences in inter-packet arrival times. Packet loss from a source to a destination during an interval refers to the ratio of the number of packets lost to the number of packets sent during that interval. Packet burst during an interval refers to the maximum number of consecutive packets lost during that interval. Preferred practice illustratively requires delay in the network of less than 50 ms, jitter of less than 20 ms and packet loss of less than 0.2% for voice calls to be considered acceptable. A call is considered bad as soon as any of these quality metrics fails to meet acceptable criteria.

In accordance with another aspect of the present invention, it proves advantageous to use Mean Opinion Score (MOS), a widely used criterion defined in ITU recommendation P.800, for assessing voice call quality. MOS typically has a range from 1 (unintelligible sounds) to 5 (perfect score), with voice calls requiring a MOS score of 4 or more to qualify as toll quality. MOS score for a voice call over the data network is a function of delay, jitter, packet loss and packet loss burst. To relate MOS to objective metrics, ITU recommendation G.107 defines an objective score "R factor" that can be mapped to a MOS score. Other particular quality metrics will be used as particular requirements and circumstances may suggest or require.

B. Framework

A framework for providing tools used to assess IP Telephony readiness of a network in accordance with illustrative embodiments of the present invention will now be described. This framework is based, inter alia, on relating end-to-end performance metrics to load on network devices. It proves convenient to assume that the principal factor affecting quality of a call is the performance of network devices on the call path. Further, the present inventive framework is advantageously described in terms of four phases: Topology Discovery, Network Device Monitoring, Call Synthesis & Call Quality Monitoring, and Analysis. Each of these phases will now be described separately.

B.1. Network Topology Discovery Phase

Discovering the topology of a target network involves identifying the set of devices in the network, the function of each (e.g., router, switch), and interconnections between devices in the network. In particular, topology discovery advantageously identifies the path between any two devices in a target network. It will be readily recognized that the accuracy of later analyses depends on accurately identifying network elements on a voice call path. Topology information discovered in the topology discovery phase of embodiments of the present invention find use in a variety of network operations, e.g., measurement, control and configuration—as will be illustrated below.

As noted above, layer-3 topology refers to connections between layer-3 (e.g., IP) addresses and devices associated with such addresses. Layer-2 topology, correspondingly relates to connections between ports. Importantly, recent increased use of virtual LANs (VLANs), has occasioned increased use of layer-2 switches in place of layer-3 routers, except at the edges of enterprise networks. With this paradigm shift, it becomes more important to fully discover topology involving layer-2 switches and associated impairments they introduce. It is especially important to note that in networks with VLANs, a layer-2 path may traverse many devices that remain hidden at layer 3. In such situations, discovering only layer-3 topology can lead to misleading results. Accordingly, illustrative embodiments described below include techniques for systematically performing both layer-2 and layer-3 topology discovery.

B.2. Network Device Monitoring Phase

During the network device-monitoring phase, it proves useful to collect network load statistics from devices in the network that are discovered in the topology discovery phase. Various statistics may be used as an indication of load on a network device. For instance, for a given device, the number of incoming and outgoing octets on all of its interfaces, the number of discarded packets on all of its interfaces, and CPU usage, among other factors, constitute measures of load. Because call quality can be affected by adverse network conditions of even short duration, it proves advantageous to collect device statistics at appropriately fine resolution.

B.3. Traffic Synthesis & Traffic Quality Monitoring Phase

It proves advantageous in illustrative embodiments of the present invention to carry out synthesis (e.g., injecting voice traffic) of traffic flows representing the target applications while performing network device monitoring. In particular, upon injecting this traffic two types of information are advantageously collected: end-to-end quality metrics and path information. In the subsequent description these flows will be referred to as "calls." Call quality metrics of interest are illustratively the above-noted end-to-end delay, jitter, packet loss, and packet loss burst. Path information proves to be of special importance in subsequent analysis, as will be seen below.

B.4. Analysis Phase

After collection of call and load statistics for a target network over an appropriate time period, an analysis phase begins with the integration of call and network device load statistics. Timestamps at which measurements are collected prove very useful in such integration. An important aspect of network assessment is the identification of bad calls and the network devices employed on call paths for such bad calls. Analysis of such data, advantageously in light of expertise of a network engineer, provides a basis for determining root causes of network problems. That is, the large amount of information collected must be analyzed in a systematic way, often based on prior experience, to efficiently isolate problematic devices or other causes. Further, it proves useful to employ certain heuristics in these analyses to help identify such problematic network devices.

Each phase of a present inventive framework will now be further detailed in the context of an illustrative system architecture.

B.5. System Architecture

Figure 4:
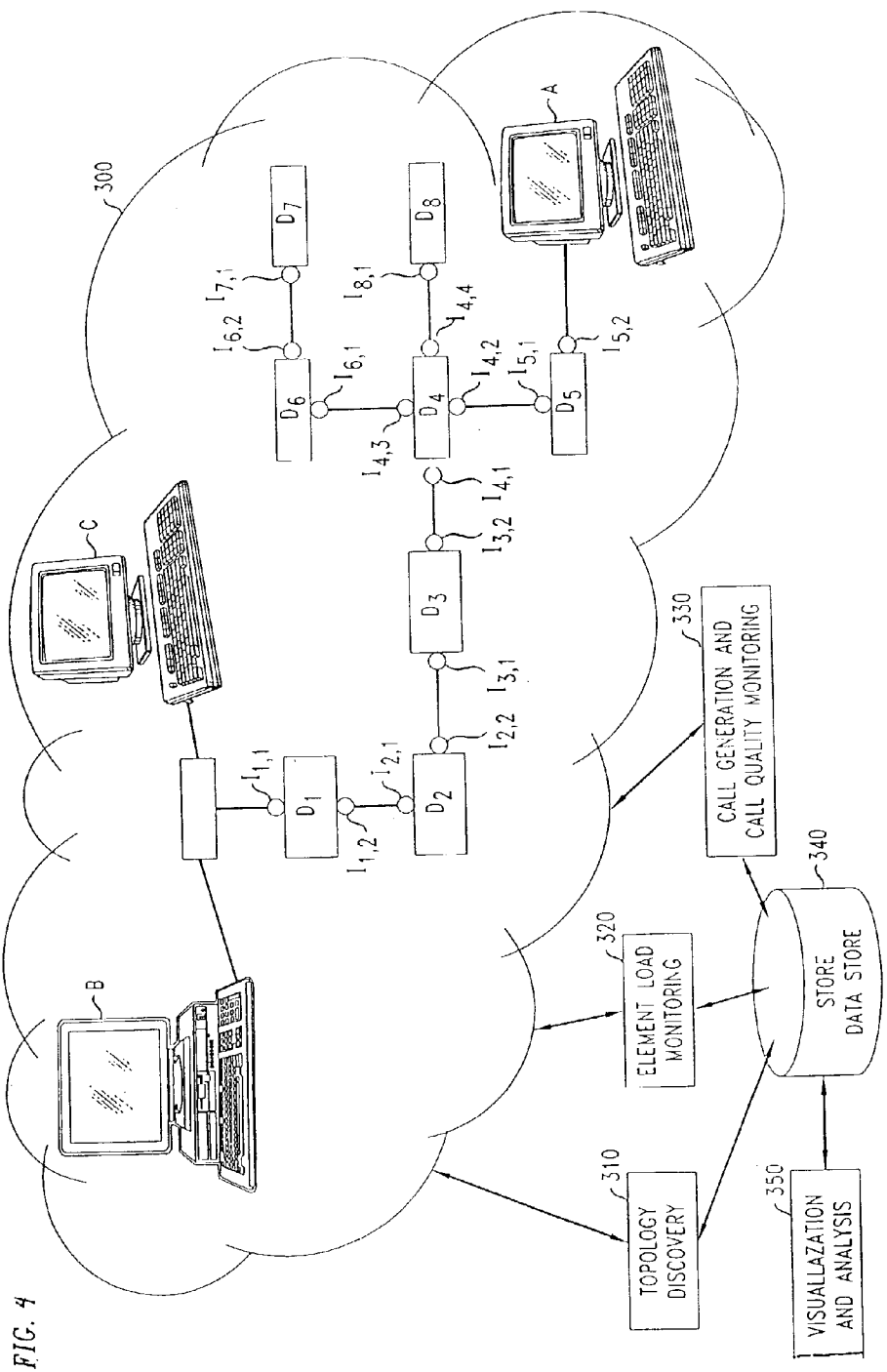
FIG. 4 is a diagram of the system of the present invention.

FIG. 4 shows an illustrative system architecture for application of the framework phases described above. In FIG. 4, arrow directions correspond to typical directions of respective information flows. The illustrative system of FIG. 4 comprises a functional block for each of the main framework elements, viz., topology discovery 310, element load monitoring 320, call generation & call quality monitoring 330, and analysis (with associated visualization tools) 350. Each of these functional units is shown in FIG. 4 in communication with data store 340 and an illustrative target network 300. Below we describe each component. The functional elements 310, 320, 330, 340 and 350 will be realized in accordance with particular embodiments of the present invention as general purpose processors under the control of respective software modules. In appropriate cases, resources of such processor(s) and software modules will be shared between or among the several functional elements.

To the extent that functional elements 310, 320, 330, 340 and 350 in FIG. 4 are not physically integrated, e.g., in a common processor configuration, they are advantageously connected over a portion of network 300 or over a separate network (with interconnection to one or more target networks 300). Thus, while some embodiments of the present invention will deploy some or all of these functional elements at a common location (or within a common processing arrangement) serving a current target network, no such common location is necessary or appropriate for all embodiments. In particular, it may prove advantageous to employ a data store 340 at a given location for serving database requirements for a plurality of target networks, while having distributed instances of one or more of the remaining functional elements dedicated, at least for an evaluation period, to a particular network. In other embodiments, one or more functional units, e.g., network element load monitoring unit 320 at a particular networked location, may perform its functions for a plurality of target networks. In appropriate cases, functional elements will be replicated to serve respective portions of a network.

C. Topology Discovery

Figure 5:
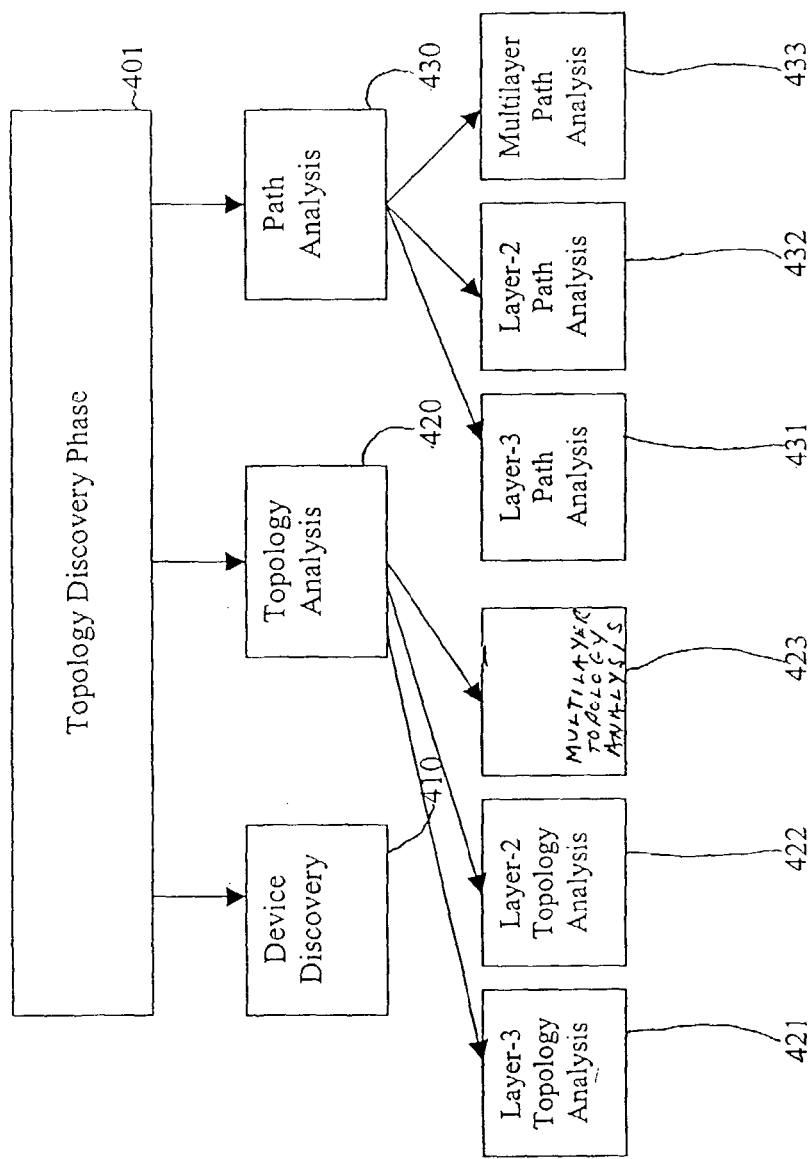
FIG. 5 is a flowchart of the Topology Discovery Phase of the present invention.

FIG. 5 shows a breakdown of the components of the Topology Discovery Phase into three main parts. First is Device Discovery (410), which discovers the set of devices in the network and collects data from them. Second is Topology Analysis (420), which finds the connections between the devices discovered in the preceding part. Third is the Path Analysis (430), which finds the paths between devices. Topology Analysis and Path Analysis are described separately for each network layer (e.g., layer 3) since the implementations of each differ greatly (421-423 and 431-433). Note that the first part (Device Discovery) must communicate with the actual network, but the other parts may run off-line using results collected by the device discovery part.

The invention, in addition to automatic topology discovery, employs manual intervention to reflect user input on the network topology. This feature complements the heuristics described in the following sections for providing accurate topology and path information as well as resolving ambiguities in the network topology. The user can input the manual edits by any of a number of ways: e.g., GUI, file input or interacting with the visual network topology display that is described in Section F on Visualization and Analysis to modify or add link entries to the topology.

C.1. Device Discovery

Figure 6:
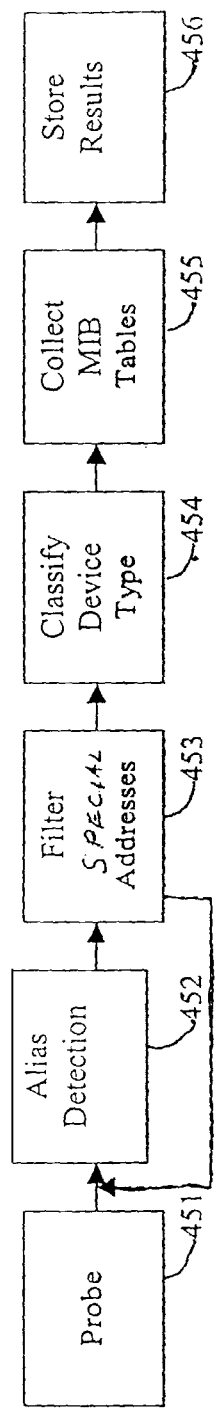
FIG. 6 is a flowchart of the Device Discovery Component of the present invention.

The primary purpose of the Device Discovery part of the Topology Discovery Phase is to find the devices in the network. In doing so, it is useful to classify the devices, filter invalid responses, and collect device configuration data (e.g., MIB tables) from the devices to be used in other phases. A flowchart of an illustrative example of an algorithm for the Device Discovery processes is shown in FIG. 6.

The first step (451) is to probe addresses in the network to get a list of addresses used by devices in the network. For example, SNMP_GET messages can be used as the probe message. An SNMP_GET message is a fundamental SNMP message to request a MIB object from a device. Thus, if we send a get message for a common MIB object (such as system.sysOID) to each address in the network, we expect all devices using SNMP to reply with the requested object. A list of addresses is obtained by recording the addresses that respond to the requests.

The second step, alias detection, (452) identifies cases where one device responded to multiple addresses (i.e., the address is aliased). It is common for devices (e.g., routers) to be assigned multiple addresses. Since we are interested in a list of devices, rather than a list of addresses, it is advantageous to identify which addresses belong to the same device. Given that we can identify when a single device responded to multiple addresses, this step marks the repeated addresses such that the subsequent steps will only use one of the device's addresses.

An example of how this can be done is as follows. Certain data, such as physical addresses (e.g. MAC addresses), are assigned uniquely to devices and are readily available via SNMP (the standard interfaces MIB contains the physical address used for each interface on the device). Thus, if a device responded to multiple addresses, the interface tables collected from each of its addresses would have the same physical addresses, and interface tables collected from addresses used by distinct devices would have different physical addresses.

The third step (453) is to filter devices that responded to a special address such as a broadcast or network address. It is common for devices to respond to requests to either a broadcast address or network address. This step corrects for data collected from these special addresses. It first identifies the set of addresses that are broadcast or network addresses. Next, it determines if data in step 452 used such an address. If so, step 452 is repeated for that device, but excluding the special addresses.

An example of how this step can be implemented using SNMP is based on learning the subnet addresses for the discovered devices. The relevant subnets are available in the device's ip.ipAcldressTable MIB object (and, similarly, in the ip.ipRouteTable MIB object). From the address table, the network address and the broadcast address can be calculated easily for each subnet the device belongs to; the network address is in the table directly and the broadcast address can be easily calculated from the network address and the network mask, which are in the address table. After determining the network addresses and broadcast addresses, this step checks if any device is using addresses that match these addresses. If so, step 452 is repeated for that device, but the second time through step 452, it checks the list of special addresses found in step 453 so that the device is not assigned a special address.

The fourth step (454) is to classify devices by their device types. This step identifies the type of each device (e.g., router, switch, printer, host) so that the system can later request information by device type (e.g., request a list of all routers) and layer.

An example of how this step can be implemented using SNMP is to use a lookup table that maps known system.sysOID MIB objects to the device type. The system.sysOID MIB object is a sequence of numbers that identifies the type of device. The first part of the system.sysOID MIB uniquely identifies the device's vendor. The rest of it is assigned by the vendor to more specifically describe the category of devices (e.g., model, product line). The mapping for known system.sysOIDs can be stored in a database.

Another example is to use a heuristic approach based on specific MIBs. The heuristic may have rules such as "if the device uses the Printer-MIB, it must be a printer" or "if the device uses Bridge-MIB's dotIdBaseType, the device must be a switch".

Another example is to use network mapper (nmap) which is an open source utility for determining the hosts in a network as well as information pertaining to these hosts such as the type of service each host provides, operating system version information, etc.

The fifth step (455) is to collect device configuration data (e.g., MIB tables) from each device. This step collects the configuration data needed by other parts of the system, from each known device. In this step, depending on the device type, different tables may be collected from different devices. Standard MIB tables advantageously describe the necessary configuration data in vendor-independent tables that are often accessible from the devices (e.g., via SNMP).

Finally, the sixth step (456) is to store the results of the previous steps. The device discovery results are stored in stable storage such as a database. Though it is conceptually easier to describe this step as a separate step at the end, in practice, it is easier to store the results as they are being collected.

It should also be noted that the sequential order of these steps (as presented in FIG. 6) is not essential. For example, it may be easier to perform the device classification in parallel with alias detection.

Network administrators may use access control mechanisms to protect against unwanted access. For example, the SNMP protocol (SNMPv1 and SNMPv2) uses a concept called a community string to provide access control. A device only responds to requests that use a community string that it is configured to use. Network administrators provide protection against unauthorized access by configuring the devices to use a non-standard community string. In this context, the system administrators can provide the user with any non-standard community strings used in the network.

In the case where non-standard or multiple access control parameters (e.g., community strings) are used, a slight modification of the steps above are needed. In step 451, the probe must be repeated for each control parameter. When a device responds, the system must record which control parameters were used for that device. In the remaining steps, when requesting data from a device, an appropriate set of parameters needs to be used.

C.2. Topology Analysis

The second part of the Topology Discovery Phase, Topology Analysis (shown as 420 on FIG. 5), determines the network topology. This part is further divided into (a) the layer-3 topology (421), (b) the layer-2 topology (422), and (c) the multilayer topology (423). Multilayer topology analysis refers to identifying connections between layer-3 and layer-2 devices (423).

C.2.1. Layer-3 Topology Analysis

The layer-3 topology is derived from the route tables from each router in the network. The output is both the set of layer-3 links between routers and the set of devices that may be connected to each router. In parts of the network where layer-3 devices have not been discovered, the topology may have an "undiscovered router cloud," which indicates where routers may be missing from the discovered topology.

The route table provides important data about the router. It provides:

1. a list of addresses assigned to the router (which is also contained in the ipAddress MIB table),
2. the subnets that are directly connected to the router,
3. the set of addresses used by neighboring routers, and
4. a list of rules describing how to route packets through the network.

Recall from above that the route table is divided into direct and indirect route entries. The direct route table entries list the subnets (given as a subnet address and subnet mask) directly connected to the router as well as the address the router uses on that subnet (as well as the interface the address is assigned to). The indirect route entries give an address on a neighboring router. A basic purpose of the table is to specify the rules that the router uses to determine where to route each incoming packet (based on the packet's destination address).

Figure 7:
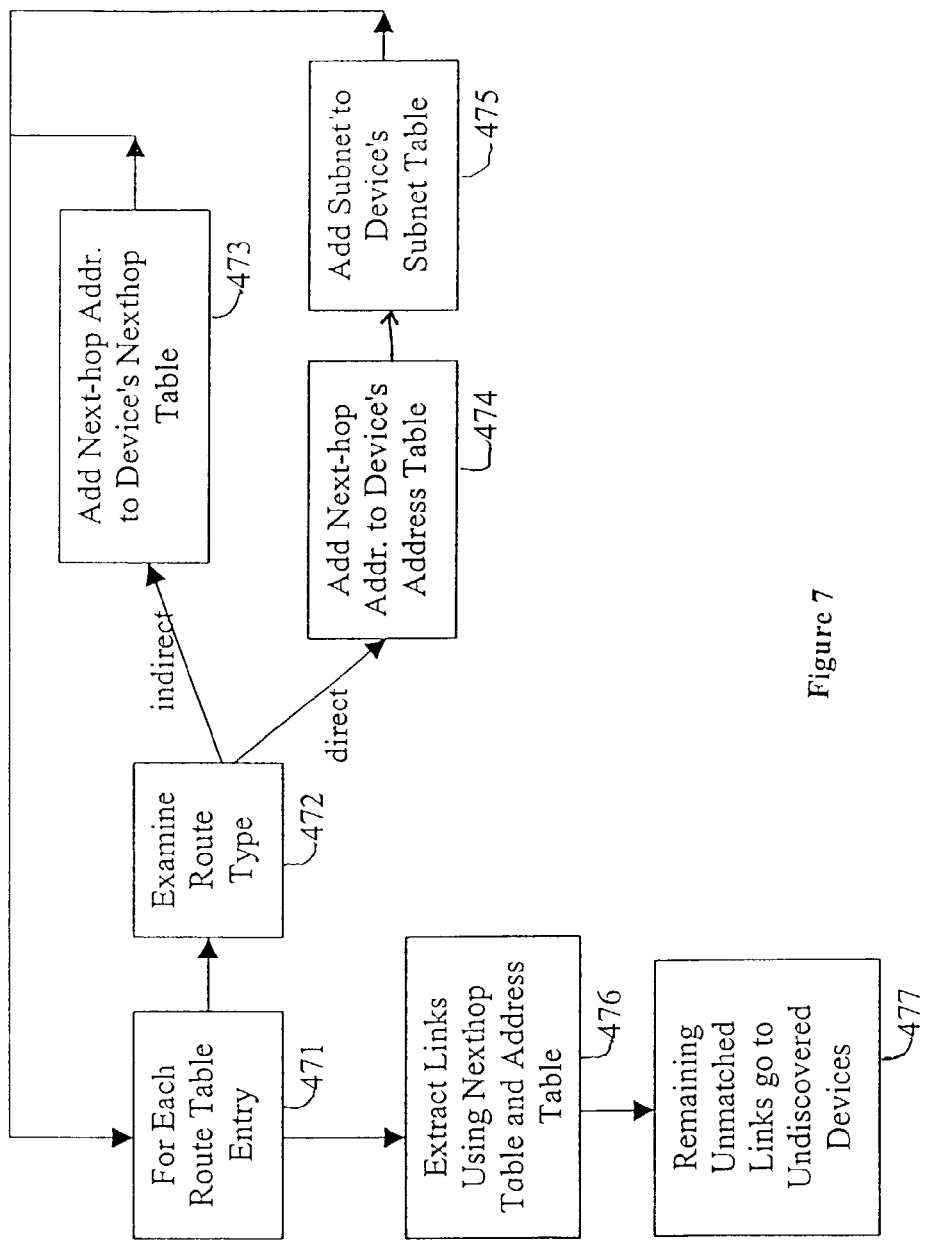
FIG. 7 is a flowchart of the layer-3 topology analysis of the present invention.

An illustrative example of an algorithm for generating the layer-3 topology is shown in FIG. 7. It finds the layer-3 links between routers by searching through each router's route table (471). During the search, three tables are created: the address table, the nexthop table, and the subnet table. The tables that are updated depend on the route type (472). The first table, the nexthop table, is a mapping from a device to the addresses used by neighboring devices. The second table, the address table, is a mapping between addresses and the device the address is assigned to. The third table, the subnet table, lists the subnets that are directly connected to each router (and the router's address on the subnet). For each indirect route, an entry is added to the nexthop table (473), unless the table already has a matching entry. For each direct route, an entry is added to the address table (474), unless the table already has a matching entry. An entry to the subnet table may also be an entry added from the direct route entry (475). The subnet table is used later to find the layer-3 links (e.g., between routers and other layer-3 devices). Such links are found by selecting the subnet entry that contains the address of the non-router device (e.g., host).

After the search is complete, a simple algorithm can be applied to extract the layer-3 links from the tables. For each entry in nexthop table, if the next-hop address has an entry in the address table, there is a link between the device in the nexthop table entry and the one in the address table entry (476). If there is no matching entry in the address table entry, it indicates that there is a router that has not been discovered that uses the address in the nexthop table entry. All the undiscovered routers can be combined to form what is called an undiscovered router cloud (477).

C.2.2. Layer-2 Topology Analysis

Next, we present the layer-2 topology analysis part (shown as 422 in FIG. 5). One approach uses information about the spanning tree. Other approaches may be needed when the spanning tree information is unavailable (or the spanning tree is not used). In such cases, manual intervention also provides resolution from the user.

The terms switch and bridge can be used interchangeably; in the context of the spanning tree, the term bridge is generally used. To detect loops in the topology, bridges run a spanning tree algorithm. From graph theory, a spanning tree is a tree (i.e., a loop-free graph) connecting all the nodes in the graph. In networking terms, the nodes are switches and the edges are layer-2 links. The links in the spanning tree may forward frames, but the links not in the spanning tree (i.e., in a blocking state) may not forward frames (unicast or broadcast). As a result, the active topology (the set of switches connected by the forwarding links) is loop-free.

The most common algorithm used is the industry standard IEEE 802. ID Spanning Tree Algorithm Protocol (see ANSI/IEEE Std. 802.1D: Part 3 Media Access Control (MAC) Bridges, 1998 ed., 1998). It defines these terms:

Bridge ID, an 8-octet identifier consisting of a 2-octet priority followed by the lowest 6-octet physical address assigned to the bridge, Bridge Port, a two octet identifier for an interface on a bridge, Designated Root, the Bridge ID of the root bridge seen on the port, Designated Bridge, the Bridge ID of the bridge connected to a port (or its own Bridge ID), Designated Port, the Bridge Port of a port on the Designated Bridge, Path Cost, the cost assigned to a link, and Root Path Cost, the sum of the Path Costs along the path to the root bridge.

Each bridge records the values for Bridge ID, Bridge Port, Designated Root, Designated Bridge, Designated Port, Path Cost, and Root Path Cost for each port in the Spanning Tree Port Table. The values are updated by exchanging messages with its neighbors. The messages allow each bridge to find (a) the root bridge and (b) the shortest path (i.e., the lowest cost path) to the root. The messages include the bridge's Bridge ID and Bridge Port, the Designated Root, and Root Path Cost values it has learned thus far to each neighbor.

Informally, this standard algorithm works as follows. Upon receiving a message, the bridge learns (a) of a new Bridge Root if the neighbor's Bridge Root has a lower Bridge ID than the current Bridge Root, or (b) of a better path to the Bridge Root if the new Root Path Cost is the lowest among the bridge's ports. When the bridge updates its Designated Root ID or shortest path to root, it sends another message to its neighbors. The protocol converges when all bridges have the same Bridge Root and the spanning tree includes the lowest cost paths from each bridge to the Bridge Root.

Each bridge maintains in its local storage the data learned after running the Spanning Tree Algorithm, including the fields shown in Table 2. The layer 2 topology analysis requires obtaining the spanning tree data from each bridge, for example, by using the SNMP protocol to query the dot1dStpPortTable defined by the Bridge-MIB (see, "Decker, Langille, Gijsinghani, and McCloghrie, "Definitions of Managed Objects for Bridges", July 1993, RFC 1493). The Bridge-MIB also provides tables to identify the device's bridge address and the translation between the port number used in the Bridge-MIB tables to identify each of the device's interfaces, and the interface index (ifIndex) used to identify each interface in most other MIBs. For purposes of illustration, we refer at times below to the Bridge-MIB in order to clearly explain the operation of the layer-2 topology analysis.

TABLE 2

MIB Objects for Bridges

| MIB Object defined by Bridge-MIB | Description |
| --- | --- |
| dot1dBridge.dot1dBase.dot1dBaseBridgeAddress | Bridge ID |
| dot1dBridge.dot1dBase.dot1dStpPortTable | results from Spanning Tree Algorithm |
| dot1dBridge.dot1dBase.dot1dBasePortTable | mapping from Bridge Port to ifIndex |
| dot1dBridge.dot1dBase.dot1dTpFdbTable | forwarding table |
| interfaces.ifTable | MIB-II interface table (per interface description and statistics) |

Figure 1:
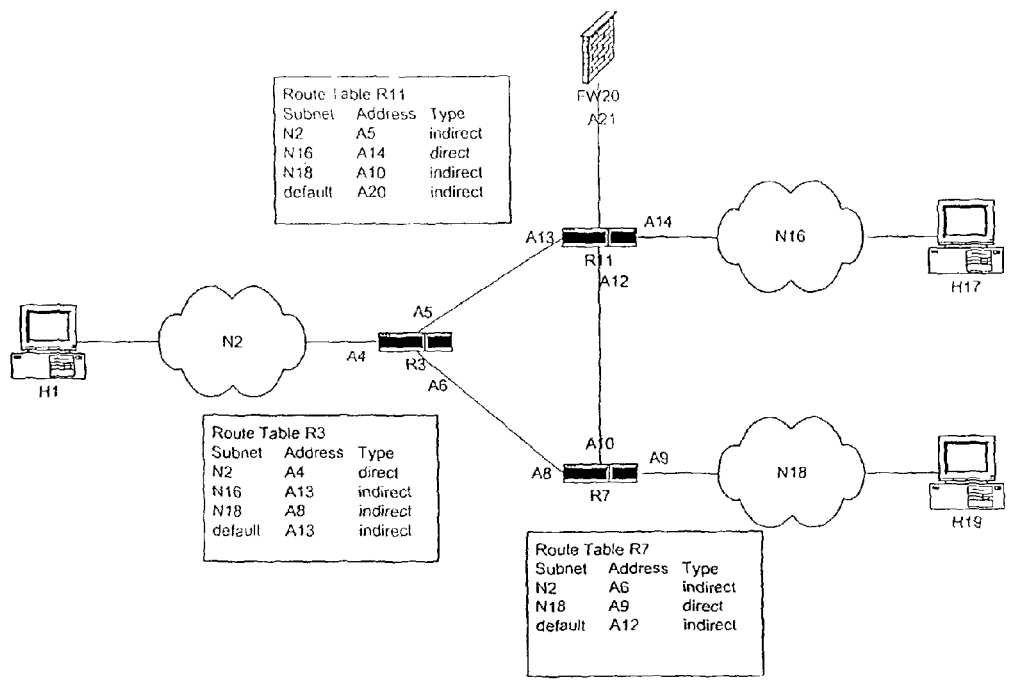
FIG. 1 is a diagram showing an example layer-3 network with route tables.
Figure 2:
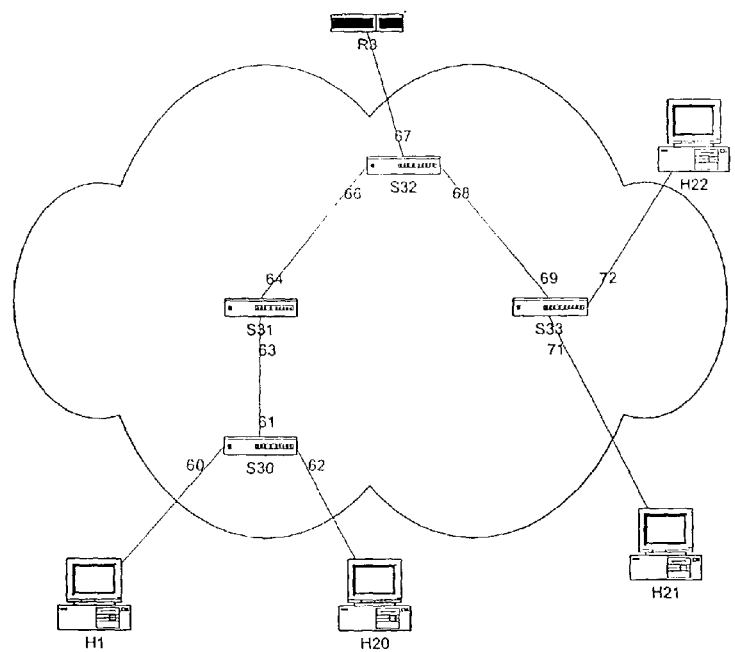
FIG. 2 is a diagram showing an example layer-2 network with forward tables.
Figure 8:
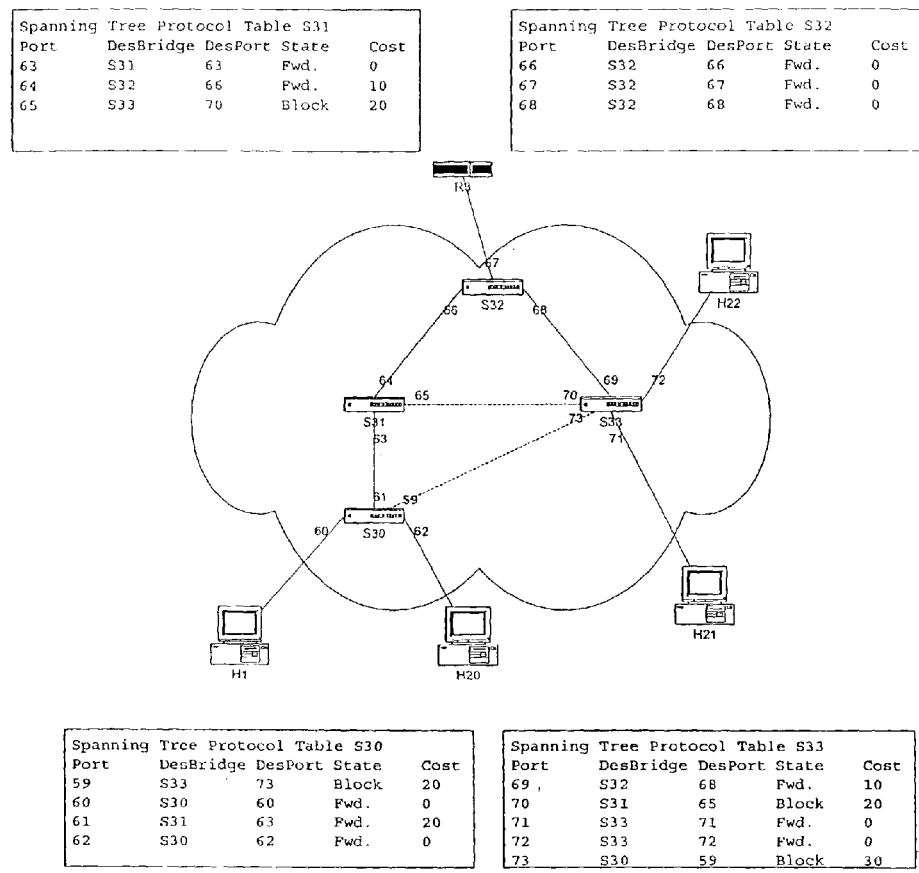
FIG. 8 is a diagram of an example layer-2 network with spanning tree protocol information.

FIG. 8 gives an example network that is identical to the one in FIG. 2 except that two blocked links (shown as dashed lines) have been added and it provides the simplified spanning tree tables for each switch. In the spanning tree tables, the first column is the port on the local switch, the second column is the Designated Bridge (for simplicity the switch label is used instead of the Bridge ID), the third column is the Designated Port (again for simplicity, the port number is used instead of the 2-octet string representation), the fourth column is the port state-either forwarding (Fwd.) or blocking (Block), and the fifth column is the Root Path Cost, (which is set to 0 where there is no path to the root on the port). We assume that each link has a cost of 10 and that the root bridge is S32.

As an example of how this standard protocol works, consider S31. Port 64 connects directly to S32, the root bridge. S32 must send a message to S31 (which it receives on port 64) to indicate that there is a path to the root from S32 using port 66 with a cost of 10. Thus, the switch is able to fill in the entry for port 64. S30 sends a message to S31 (port 63) saying that its shortest path to the root is through that link. Because S31 is the designated bridge for the link, the designated port (which always belongs to the device that is the designated bridge) is 63. Thus, S31 only records that port 63 connects to a link away from the root. For port 65, it finds that there is a path with a cost 20 toward the root through port 70 on S33. Since S31 already has a lower cost path toward the root, the link is set to the blocking state. The address (S33), port (70), and cost (20) are recorded in the table, for port 65.

Figure 9:
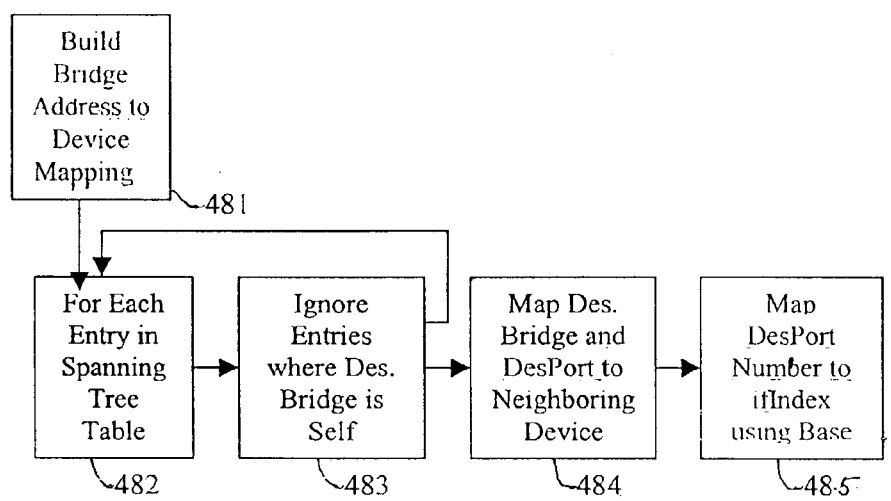
FIG. 9 is a flowchart of the layer-2 topology analysis of the present invention.

An illustrative example of an algorithm for determining the layer-2 topology follows directly from the data stored in the Bridge-MIB and is shown in FIG. 9. The algorithm assumes that the switches have been identified by the Device Discovery part and the appropriate MIB tables from each layer-2 switching device have been collected. The algorithm operates as follows.

First (481), the algorithm finds the bridge address(es) for each device. Normally, this information is collected directly from the BridgeMIB. In practice, vendors do not always comply fully with the Bridge-MIB standard and may use other bridge addresses not identified in the Bridge-MIB. These cases are handled using vendor-specific variations of the following technique. The physical addresses used by each device can be learned by querying its interface table MIB and/or its Forward Table MIB. (A forward table MIB entry typically has a field to indicate that the entry's address refers to the local device itself). Each bridge address found to correspond to one of these physical addresses is identified as a bridge address for the device.

Next the topology analysis algorithm identifies the layer 2 links in the network, as follows. Recall that each layer 2 link is identified by a pair of device identifiers, say $D_i$ and $D_j$, and by a particular interface on each of the devices, say $I_{i,m}$ and $I_{j,n}$. The algorithm iterates (482) through the spanning tree table entries of all layer-2 switching devices in the network. For each entry in the spanning tree table of a device $D_i$, that identifies for port $P_{i,m}$ the designated bridge is $D_j$ and the designated port is $P_{j,n}$, the algorithm processes the entry as follows: If the designated switch $D_j$ in the entry is the same as $D_i$ then the entry is skipped (483). Otherwise the entry indicates there is a layer-2 link between $D_i$ and $D_j$ using ports $P_{i,m}$ and $P_{j,n}$ (484). The port numbers $P_{i,m}$ and $P_{j,n}$ thus identified are mapped to the interface IDs of the link by locating the dot1dStpPortTable MIB entry at each device that matches each the device's port number. That is to say, the entries for ports $P_{i,m}$ and $P_{j,n}$ in the dot1dStpPortTable MIBs of $D_i$ and $D_j$, respectively, provide the ifIndex (485) values $I_{i,m}$ and $I_{j,n}$ that are recorded by the algorithm to identify the particular layer 2 link from $D_i$ to $D_j$. Each entry is processed in this same manner until all of the layer-2 links are identified. The set of identified links, along with the layer 2 devices already identified earlier, comprise the output of the layer-2 topology analysis algorithm.

The IEEE 802.1D Spanning Tree Algorithm lacks support for VLANs. To support VLANs, vendors have introduced variations of the algorithm to include a VLAN tag. To have load-sharing across VLANs, it is common to have separate spanning trees per VLAN. This requires using a different root election procedure. While most variations on the 802.1D algorithm are proprietary and non-interoperable, we incorporate this information as follows.

In networks with VLANs we would like to find the spanning tree for a particular VLAN. Such devices generally have a proprietary (vendor specific) MIB that is a variation of the dot1StpPortTable but including a VLAN field. The process can be repeated using only those lines in the vendor specific stpPortTable whose VLAN field match the given VLAN ID. For example, Avaya Inc.'s Cajun™ switches use the promBridge-PortTable table, which includes a VLAN identifier that can be mapped to the VLAN number using the prom VlanTable table.

Without VLANs, a link will only appear in one switch's StpPortTable, in particular, the switch that is farther from the bridge root. With VLANs, the bridge root may change from one VLAN to another. Thus, the link could appear in both switches' StpPortTable tables.

The spanning tree approach only works when the devices use the spanning tree protocol. In cases where the spanning tree protocol is not used, an alternative approach is needed. One such approach is to find the layer-2 topology using the forwarding tables from each switch. For examples of solutions to this problem, see Y. Breitbart, et al., "Topology Discovery in Heterogeneous IP Networks," in *Proc. of the 2000 IEEE Computer and Communications Societies Conf. on Computer Communications* (INFOCOM-00), (Los Alamitos, Calif.), pp. 265-274, Mar. 26-30, 2000 and B. Lowekamp, D. R. O'Hallaron, and T. R. Gross, "Topology Discovery for Large Ethernet Networks," in ACM SIGCOMM 2001, (San Diego, Calif.), pp. 237-248, Aug. 27-31, 2001.

C.2.3. Multilayer Topology Analysis

The third part of Topology Analysis is finding the connections between the layer-3 entities (e.g., hosts and routers; referred to herein simply as hosts) and the layer-2 switches (See 423 in FIG. 5).

Two devices are said to be directly connected when the path between them does not include any other discovered device. A device, $D_t$, is directly connected to $I_{s,i}$ the ith port on device $D_S$, when $D_t$ and $D_S$ are directly connected and the path between them uses $I_{s,i}$. A switch trunk is a link between two directly connected switches. The switch ports to such a link are considered on the trunk.

An example way of deriving the connections between layer-3 and layer-2 devices involves searching the forwarding tables of layer-2 devices for the physical addresses of the layer-3 devices. A switch's forwarding table includes entries with a physical address and the port number it uses to forward packets to the host addressed by the physical address, M. The layer-3 device addressed by M (i.e., the host assigned the physical address, M) is referred to as Host(M). We define F(s,M) as the port, $I_{s,i}$, for which the switch, $D_s$, has a forwarding entry for M on that port or the empty set where there is no such entry in $D_S$'s forwarding table. In a valid network configuration, each non-empty F(s,M) is (a) a port on the switch trunk from $D_s$ one hop closer to Host(M) in the topology, (b) a port directly connected to Host(M), or (c) both. The third case is when the trunk and the link to the host are shared or connected to a switch that was not found in layer-2 discovery.

The rule, If switch $D_s$ has a forwarding entry for physical address M on port $I_{s,i}$ that is not on a switch trunk, Host(M) must be directly connected to the switch, provides a simple, efficient sufficiency test to discover the port directly connected to a device. That is, if any switch has an entry on a non-trunk interface for a physical address used by the host, it must be directly connected to that port. In practice, this sufficiency condition generally holds because switch trunks are seldom shared with hosts and the switch directly connected to the host generally has a forward table entry for the host.

Note that the converse of the rule is not necessarily true. Two switches, $D_S$ and $D_t$, and a host, $D_h$, could all be connected via a hub that was not previously discovered. In this case, the ports on each switch to the hub, $I_{s,i}$ and $I_{t,j}$, are directly connected because the path between them does not involve any other switch in the topology. Since $D_h$ is also directly connected to $D_S$ and $D_t$, it is possible for a host to be directly connected to a switch via a switch trunk.

The first heuristic is to apply the above rule. A second heuristic may be used to handle cases not covered by the first. The second rule states Given switch $D_s$ has a port $I_{s,i}$ such that F(s,M) is non-empty and F(s,M)≠$I_{s,i}$, Host(M) cannot be located on the branch of the topology connected to $I_{s,i}$.

Figure 10:
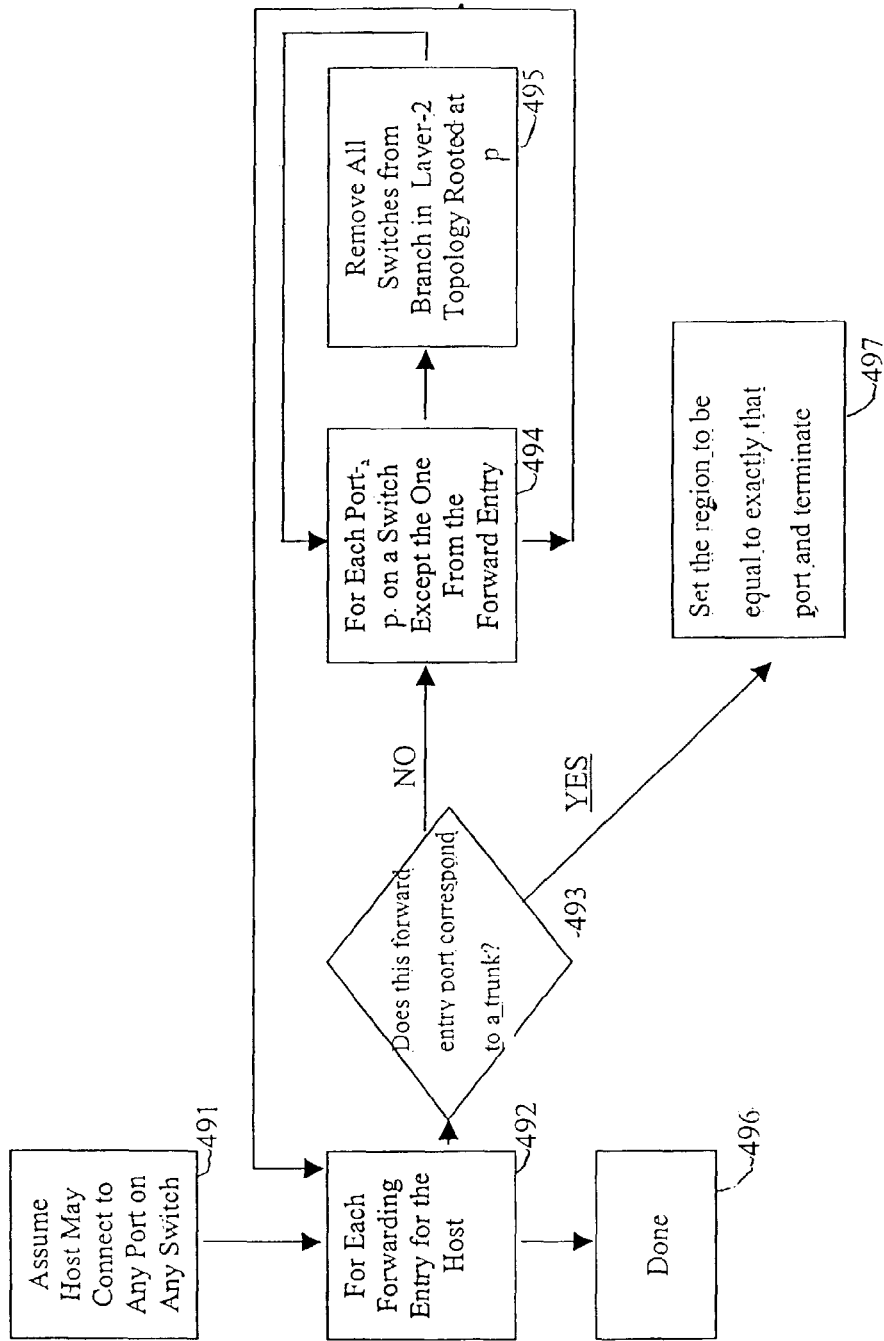
FIG. 10 is a flowchart of the method for connecting layer-3 elements to layer-2 topology of the present invention.

This rule can be used to identify the smallest region (set of switch ports among the known switches) that a target host might connect to. FIG. 10 provides a flowchart of an illustrative example of an algorithm for applying the second rule to find the location of a layer-3-device with respect to a layer-2 network.

The algorithm to locate a host that has physical address $M_X$ in the layer-2 network is as follows. Recall that the objective is to automatically identify the smallest possible set of interfaces $I_{possible}(M_X)$ such that it cannot be (automatically) determined that the host in question is not connected to an interface in $I_{possible}(M_X)$. In the best possible case, $I_{possible}(M_X)$ will contain exactly one interface when the algorithm completes. First (491), the algorithm initializes $I_{possible}(M_X)$ to contain all interfaces on all switches, as identified previously in the discovery part. The remaining steps serve to remove, or "prune", interfaces from $I_{possible}(M_X)$.

Next (492), the algorithm searches each forward table for any non-trunk entry that definitively identifies $I_{possible}(M_X)$ as being connected to a single interface, as given by heuristic rule one earlier (493, 497). If no such definitive entry is found, then the algorithm searches according to heuristic rule two for entries that do not identify $M_X$ as the target address, and uses these entries to prune the set $I_{possible}(M_X)$. In other words the algorithm considers each switch $D_S$ and port $I_{s,i}$ such that F(s, $M_X$)=$I_{s,i}$. As an optimization, if $D_S$ has been removed from the region, the entry provides no additional information and can be skipped (494). Otherwise, the algorithm applies the heuristics described above.

Next (495), by the second rule, the host must be located in the subtree rooted at $I_{s,i}$ (conversely it may not be in any subtree rooted at any other port on $D_S$). Thus, the algorithm removes all ports on the switches in subtrees rooted at any port on $D_S$ other than $I_{s,i}$, and it removes all ports on $D_S$ other than $I_{s,i}$.

Once all forward table entries have been processed (496), the resulting region of the network, defined by the interfaces in $I_{possible}(M_X)$, is the minimal region where the host might be connected (given the topology and forward table entries). Recall that user input as discussed earlier, resolves ambiguities whenever necessary, such as when $I_{possible}(M_X)$ contains more than the desired single interface.

Figure 11:
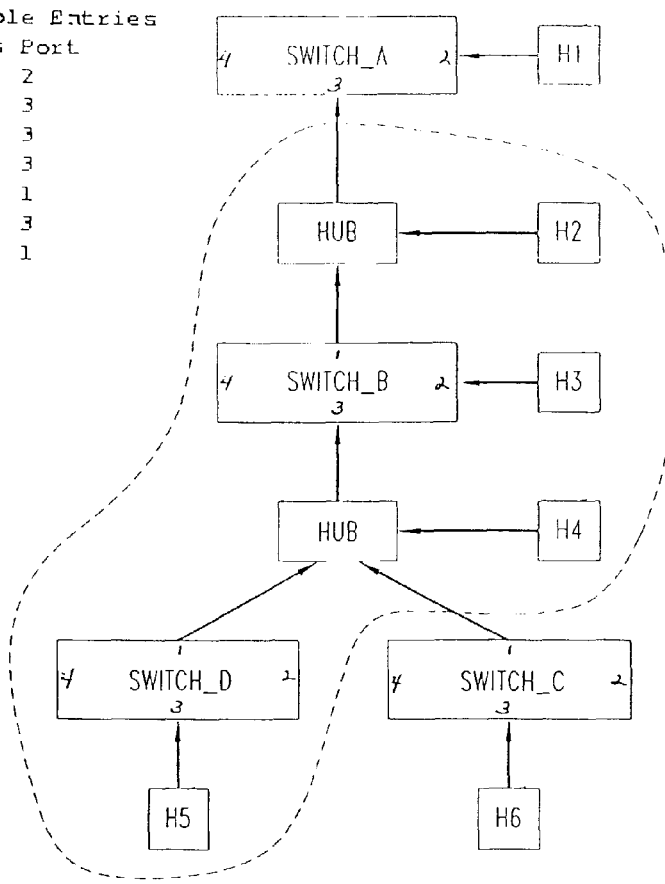
FIG. 11 is a diagram of an example for demonstrating multilayer topology analysis.

The following examples illustrates how to locate layer-3 devices Host($M_d$), Host($M_e$), Host($M_f$), and Host($M_g$) on the sample network with sample forwarding table entries in FIG. 11. The switches in the figure are labeled as switches; the hubs and hosts (e.g., H1) are hypothetical and serve to denote network locations.

1. For Host($M_d$), the only forwarding entry is— F(A,$M_d$)=2. Thus, the region contains only $I_{A,2}$. We could have come to the same conclusion by noting that $I_{A,2}$ is a non-trunk.
2. For Host($M_e$), there are two forwarding entries F(A,$M_e$)=3, and F(B,$M_e$)=1. The first entry eliminates the ports 1, 2, and 4 from A. The second entry eliminates C, D, and ports 2-4 from B. The resulting region contains $I_{A,3}$ and $I_{B,1}$, suggesting the host is located where H2 is shown.
3. For Host($M_f$), there are two forwarding entries F(A,$M_f$)=3, and F(C,$M_f$)=1. As above, the first entry eliminates ports 1, 2, and 4 from A. The second entry eliminates just ports 2-4 from C. The resulting region is shown in FIG. 10 by the dashed line.
4. For Host($M_g$), there are two forwarding entries, F(A,$M_g$)=3 and F(B,$M_g$)=3. As above, the first entry eliminates ports 1, 2, and 4 from A. The second entry eliminates ports 1, 2, and 4 from B, as the rest of A. The remaining region is $I_{B,3}$ and all ports on C and D. Note that if we processed the forwarding entries in the opposite order, F(B,$M_g$) would have eliminated A, and there have been no need to process F(B,$M_g$).

The algorithm inputs the physical address of a host, but the user generally will only have the host's IP address. The router's ip.ipNetToMedia table can be used to find the IP address for the given physical address. If the host is a router, the path should include the port it uses to connect to the switch network, which is determined from the ip.ipAddrTable table. After learning the port to the switch network on the router, the physical address can also be found in its interface.ifTable table.

C.3. Path Analysis

The third part of the Topology Discovery Phase, Path Analysis (shown as 430 on FIG. 5), discovers the path network traffic between two devices takes through the network topology. This part is further divided into the layer-3 path (431), the layer-2 path (432), and multilayer path (433). It is worth noting that each hop in a layer-3 path involves a different subnet and the layer-2 path analysis for each subnet is independent of the rest of the other subnets along the layer-3 path.

C3.1. Layer-3 Path Analysis

Figure 12:
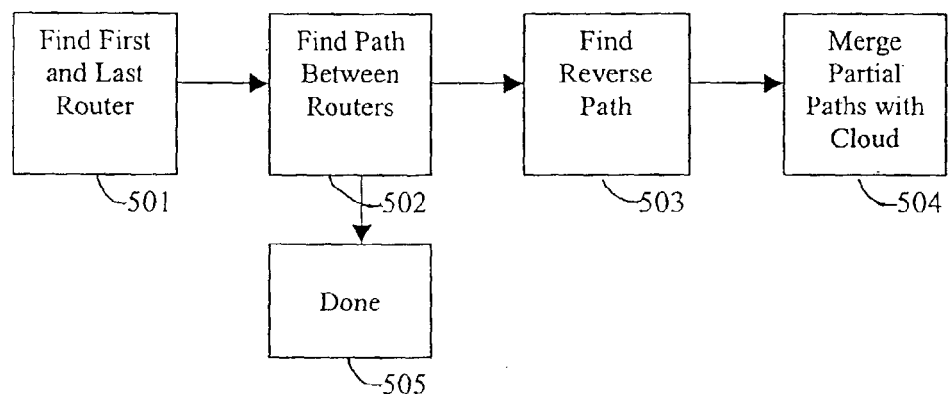
FIG. 12 is a flowchart for generating a layer-3 path.

An illustrative example of an algorithm for finding the layer-3 path (431) between two layer-3 devices is shown in FIG. 12. It contains three main parts, described in detail later. Briefly, the algorithm first finds the routers connected to the source and destination hosts (501) referred to as the first and the last device, respectively. Then the algorithm attempts to find the path between the first and the last routers (502) If the path completes successfully, the algorithm is done (505). Otherwise, the algorithm (503) attempts to find the path from the destination and combines the partial paths with a undiscovered router cloud (504).

The first and the last router are the default routers for the source and destination hosts, respectively. A convenient method for finding the default router of a host (501) is to examine the processed route tables from FIG. 7, in particular the subnet table, 475. A host's default router must have a direct route entry for the subnet containing the host, and hence, an entry in the subnet table for the host. The default router can be found by scanning the subnet table for the subnet that contains the host.

Figure 13:
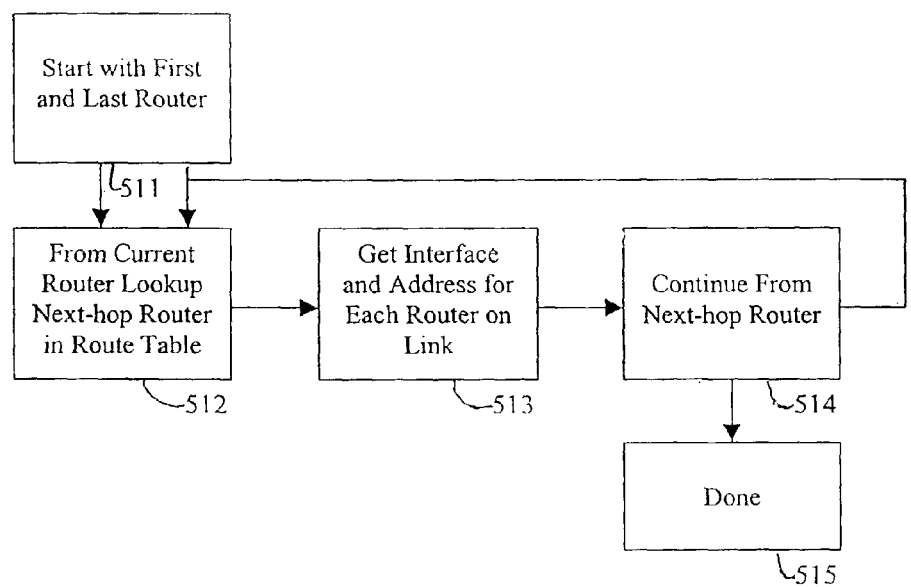
FIG. 13 is a flowchart for finding a layer-3 path.

FIG. 13 shows a flowchart of an illustrative example of how to build the layer-3 path between two layer-3 devices assuming that the first and last routers—can be determined and that all the route tables for each intermediate router are available (512).—Using the route table entries for each router in the path and the first and last routers, it is simple to trace the route to the destination address. The path can be found as follows:

1. Start by setting the current router to the first router (511).
2. From the current router, look up the next-hop address for the destination address, noting the egress interface of the current router and the ingress address of the next-hop router (512).
3. The ingress interface of the next-hop router and egress address of the current router can be found in the next-hop router's route entry back to the current router (513). (Alternatively, we could also get the egress interface of the next-hop router from the next-hop router's address table; and the egress address of the current router from its route table).
4. Next, set the current router to the one given by the next-hop address (514).
5. Repeat last three steps until the last router is reached (515).

A variation on this is to change the termination criteria so that the route entry gives a local route entry.

Experience from running this algorithm has shown that vendors interpret the meaning of the MIB specifications differently. The RouteNextHop field, in particular, has ambiguous interpretations. When the route entry is to a remote device (i.e., an indirect route entry), the RouteNextHop field is always the IP address on the remote device. When the route is a local route (i.e., a direct route entry), however, the meaning of the field has different interpretations. By RFC 1354 (see, F. Baker, "IP Forwarding Table MIB", July 1992, RFC 1354), the RouteNextHop field should always be a local IP address. By RFC 2096(see, F. Baker, "IP Forwarding Table MIB", January 1997, RFC 2096), which replaces RFC 1354, the RouteNextHop field (ipCidrRouteNextHop) should be 0.0.0.0 unless the route is to a remote device. Some implementations using the first standard use the later convention. For devices using the second convention (i.e., reporting 0.0.0.0 as the next-hop address) another step is needed to find the egress IP address. The route entry still gives the RouteIfIndex, which is the index of the interface where the packet goes. It is possible to find an IP address in the ipAddrTable (another standard MIB object from RFC 1213, which has the IP addresses assigned to the device, the interface each IP address is assigned to, and the subnet mask to use with each address) by scanning the table and selecting the IP address from an entry that matches the interface index.

So far, we have assumed that the route entries for each router in the path between two hosts are available. For nontrivial networks, this situation is seldom the reality. When data is unavailable for routers on a path, (i.e., SNMP data is unavailable from the router) the problem changes from listing all routers in the path to listing as much of the path as possible.

Figure 14:
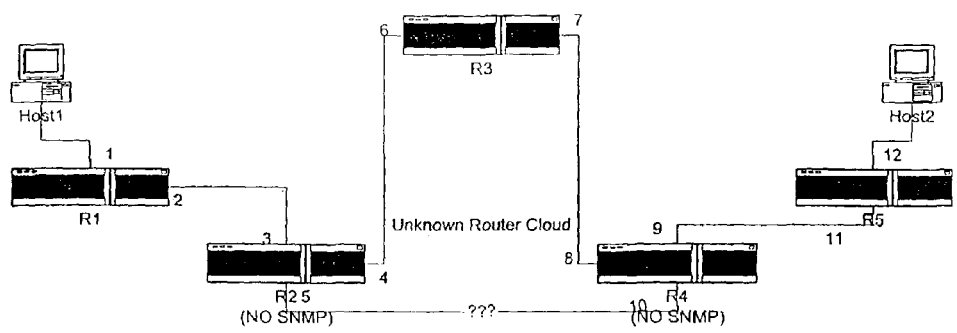
FIG. 14 is a diagram of an example network having an undiscovered router cloud.

One approach to address this case is to give the path as the actual path with the router that did not respond to SNMP removed. Another approach is to include the parts of the path from the first host to the first missing router and last missing router to the second host. The second approach is not only easier to implement but can also be—more conservative given the lack of information—. Consider the configuration in FIG. 14. It shows the actual path between two hosts; R2 and R4 do not respond to SNMP requests. If the only, information available is what is known through SNMP, we cannot exclude the possibility that there could be a link from R2 to R4. For this reason, we are content to treat the part of the path between the missing routers as an "undiscovered router cloud." If we do not limit ourselves to SNMP data and we are capable of running an active probe between the two hosts (such as traceroute), we could conclude that R3 is in the middle of the route.

A more detailed summary of putting together the steps shown in FIG. 12 follows. First, it finds the default router for the source address and destination address (e.g., by using the subnet table) (501). Next, it attempts to find the one-way path to the destination address (502). If the one-way path reaches the destination, the path is complete (505). Otherwise, the one-way path ends at the "undiscovered router cloud." To complete the path, we then run the algorithm on the reverse path (i.e., from the destination host toward the source) until it reaches the "undiscovered router cloud" (503). (In the unlikely case that the path in the reverse direction reaches the original source host, we can simply return the reverse path in reverse order.) The addresses into and out of the cloud are known from the nexthop address entries of the known routers. The resulting path is the first path followed by the "undiscovered router cloud", followed by the second one in the reverse order (504). For example, the path in FIG. 14 would be ($I_{R1,1}$, R1, $I_{R1,2}$, $I_{R2,3}$, undiscovered router cloud, $I_{R4,9}$, $I_{R5,11}$, R5, $I_{R5,12}$). Recall that user input as discussed earlier, resolves ambiguities whenever necessary.

C.3.2. Layer-2 Path Analysis

The next part of Path Analysis is to find layer-2 paths between devices connected directly at layer 3. (432 in FIG. 5). All traffic within a layer-2 network must be contained in a single subnet. Each layer-3 hop in a layer-3 path spans a single subnet. Thus, the layer-2 path analysis is applied within the context of a single subnet.

An example of a method of constructing a layer-2 path between two hosts is as follows. First, for each host, we find the region in the layer-2 topology where the host may be located (e.g., as described in FIG. 10). Recall, the meaning of the region is the minimal subset of the topology where the host may connect to. That is, the host may be connected to any port in the region, and there is no data to choose a smaller region.

These properties of the region and the property that the active layer-2 topology forms a tree lead to two cases for determining the path between the hosts-either the regions (i.e., the regions where the source or destination host may be connected) are mutually exclusive or they overlap.

If the regions are mutually exclusive (i.e., they do not overlap), the path between the hosts must contain the active links in the topology that connect the regions. There can only be one such path because the active layer-2 topology is a tree and regions are continuous.

If the regions overlap, there is a possibility that the hosts are connected to each other (e.g., they connect to an undiscovered hub in an office which connects directly to a single switch port). In this case, the path is empty because there is a possible case where no discovered switch is along the path. Recall that user input as discussed earlier, resolves ambiguities whenever necessary.

C.3.3. Multilayer Path Analysis

The third part of Path Analysis is to find the multilayer path (433 in FIG. 5). Recall that a multilayer path between two hosts is the layer-3 path interleaved with the layer-2 path for each hop along the layer-3 path. Also recall that a layer-2 path is defined on a subnet (such as a hop in the layer-3 path).

Figure 15:
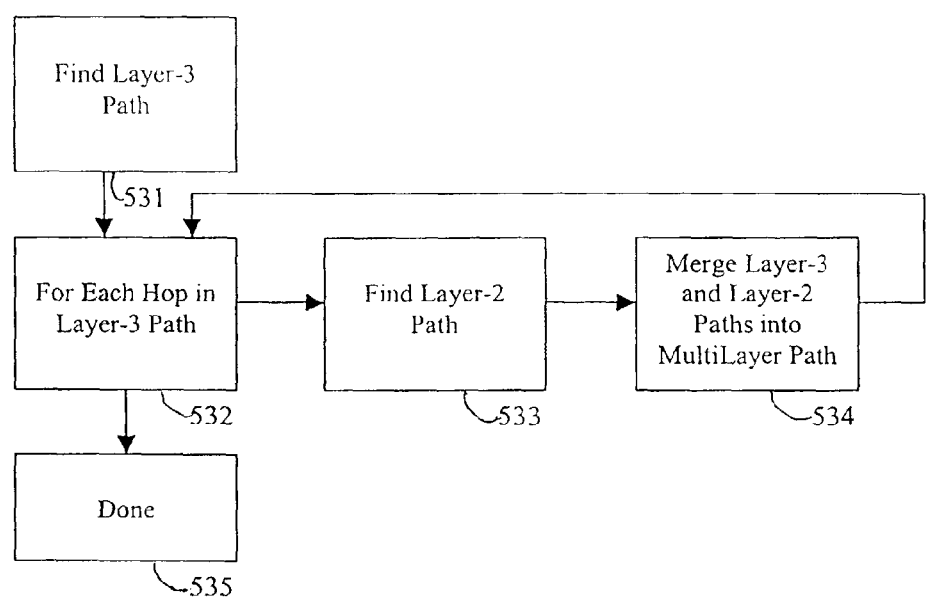
FIG. 15 is a flowchart for finding a multilayer path.

An illustrative example of an algorithm for finding the multilayer path between two devices is shown in FIG. 15. The first step is to find the layer-3 path (531). For each hop on the layer-3 path (532), the algorithm finds the layer-2 path (533). Finally, the two sets of paths need to be combined (534).

The first two steps use the output from 431 and 432 (in FIG. 5) respectively. An illustration of how the third step (534) may be done follows. Table 3 defines classes of hops in the multilayer path.

TABLE 3

Multilayer Hop Classes

| Class | Definition |
|---|---|
| L3-L3 | hop between layer-3 devices where we have no layer-2 information |
| L3-Cloud | hop from a layer-3 device to next-hop addresses in the "-undiscovered router cloud" |
| Cloud-L3 | hop between the next-hop addresses in the "undiscovered router cloud" and a layer-3 device |
| L2-L2 | hop between two layer-2 devices |
| L3-L2 | hop from layer 3 to layer 2 device |
| L2-L3 | hop from layer 2 to layer 3 device |

Table 4 shows the data used by each hop class. Device ID is a number assigned to each network device. An L3-L3 hop has layer-3 information for each side. Such a hop is only used when there is no layer-2 path data along the layer-3 hop. The L3-Cloud hop is used to give the known IP addresses of the routers on the edge of the "—undiscovered router cloud." These addresses may have been found using a discovered router's route table (in the next-hop field), but we have no information about the device using the address. The Cloud-L3 hop denotes the hop from the "undiscovered router cloud" to a layer-3 device. The L2-L2 hop connects two layer-2 devices; the pertinent data about the hop is the device ID of each device, the interface used on each device (or 0 to indicate that the port number is unknown), and the VLAN used by each device (or 0 to indicate that VLANs are not used). The L3-L2 hop and L2-L3 hops are used to go between layer-3 and layer-2. The L3 part of these hops have the information from the layer-3 hop (i.e., the device ID, IP address, and interface). The L2 part of these hops is essentially used as a placeholder. It has the same device ID as the L3 part and 0 as the interface. The next L2-L2 hop after a L3-L2 hop (and the last L2-L2 hop before an L2-L3 hop) uses the same device as the L3 device. If the interface on the L3 part is a virtual interface, the interface on the next L2 hop (or previous L2 hop for an L2-L3 hop) may be the physical interface used by the device. Recall that user input as discussed earlier, resolves ambiguities whenever necessary.

TABLE 4

Format of Multilayer Hops

| Class | Format |
|---|---|
| L3-L3 | source and destination Device ID, IP Address, and interface |
| L3-Cloud | source and destination IP Addresses, interfaces |
| Cloud-L3 | source and destination IP Addresses, interfaces |
| L2-L2 | source and destination Device ID, interface, and VLAN |
| L3-L2 | source Device ID, IP Address and interface |
| L2-L3 | destination Device ID, IP Address and interface |

C.3.4. Representation of Uncertainty

The "undiscovered router cloud" represents the uncertainty in the network topology due to incomplete information. Network paths with incomplete information are connected to the undiscovered cloud to ensure that the rest of the system takes this uncertainty into account.

In certain circumstances it is useful to subdivide the undiscovered router cloud into several regions, not necessarily disjoint, based on heuristics and partial information. The invention accomplished this as follows: The first step is to substitute a cloud on each multi-layer path that is connected to the undiscovered router cloud. We consider two clouds mergeable if there is substantial information that the two clouds might be representing the same unknown region. The invention follows the heuristic that two clouds are mergeable if for all common devices connected to both of the clouds, the source IP addresses and interfaces of these common devices are the same. The next step is to consider every pair of clouds and merge them if they are mergeable. The merge operation for clouds c1 and c2 substitutes a new cloud instead of c1 and c2 where all paths through c1 and c2 are connected to the new cloud. After each merge operation a new cloud is formed and the second step repeats until there does not exist any pair of mergeable clouds in the topology.

The implication of this alternative representation is that the L3Cloud hop shown in Table 4 is replaced by L3 Cloud and Cloud L3 where the formats are source device ID, IP address interface, destination cloud id and, source cloud id destination device ID, IP address interface, respectively.

While the strategy described above has been discussed in the context of the undiscovered router cloud at layer-3, the same strategy can be used to represent uncertainty at layer-2 as well.

D. Network Device Monitoring

Network device monitoring collects traffic, utilization, and error measurements from the devices in the network under consideration. Each measurement collected from the network devices is stored with the time of collection.

An example way to collect network utilization measurements is by polling switching devices in the network using SNMP. Other ways are telnet/CLI or LDAP. The network device monitoring component 320 of the illustrative embodiment of the present invention shown in FIG. 4 accesses the network topology data stored in the data store by the network discovery phase to obtain the list of switching devices to monitor. In this section the term device refers to a switching device. Data collection on these devices in the network involves SNMP MIBs that are indicative of traffic and utilization. More specifically, device monitoring component 320 polls SNMP agents on discovered devices to collect values for two types of MIB variables. The first type is device-specific MIB variables that pertain to the overall device, such as the total number of input packets received on all interfaces. The second type is interface specific pertaining to an individual interface, such as the total number of octets received on an interface.

In operation, element 320, shown in the illustrative embodiment of FIG. 3, polls the set of discovered network elements at regular intervals.

MIB variables are organized into sets based on their type and polling frequency. Some sets are polled more frequently than others. For example, a set of MIB variables indicating the total number of octets received and sent may be polled more frequently than others. The reason is that it generally proves advantageous to frequently poll variables that change more quickly in reflecting traffic levels at a monitored network device or an interface at such a device. MIB variable values are stored in the data store 340.

In addition to retrieving MIB variable values as described above, network element monitoring 320 also provides real-time estimates of the response time for each monitored network device. In particular, the illustrative polling operations conveniently record two timestamps for each SNMP request in the database: (i) a time stamp indicating the time at which the SNMP request was sent to a particular network device, and (ii) the time at which the result was received. For each monitored device, the maximum difference between the request and reply timestamps of all measurements collected during an interval is an estimate of that device's response time for that interval. One issue in monitoring network devices for any of a variety of load variables is that the queries sent by load monitoring element 320 itself introduces SNMP traffic to the network and affects load on queried network devices. While there may be some instances where any analysis based on received responses to MIB variables will take this incremental device/port loading into account, most applications of the illustrative polling techniques will show such incremental load to be insignificant.

Thus, it is seen that this process of monitoring a network captures the network behavior over a period of time from the perspective of the load on switching devices and links in the network.

E. Traffic Generation and Monitoring

The traffic generation and monitoring component, operating concurrently with the device monitoring component, injects traffic flows representing the target application to the network while collecting end-to-end quality metrics and layer-3 path information. In the subsequent description these flows will be referred to as "calls." End-to-end quality metrics are measured at the endpoints of each call, and measurements are preserved for both directions of a call. The layer-3 path information, collected using traceroutes initiated by the endpoints during the call, is used to verify that the call path is following the predicted path based on router tables.

Traffic injection is carried out "around the clock" for several days, typically at least five business days. The objective is to ensure that the data collection occurs during time sensitive congestion that may occur in the network and, in particular, to observe the network at daily and weekly peak, or "busy hour", loads.

In the case of VoIP there are several ways to generate or inject the voice traffic into the network, including using actual or simulated IP telephony equipment. The basic requirement is that the injected traffic should emulate a full duplex call. In other words, RTP packets containing a payload that simulates the actual amount of data in a VoIP RTP packet should be exchanged at regular intervals between a pair of call endpoints. The call endpoints can be IP telephones, computing devices that simulate the RTP packet flows, or a combination of both. For the sake of simplicity, we refer to the generated voice traffic as synthetic traffic regardless of how the voice traffic is generated.

Voice traffic injection has many parameters that impact the effectiveness of our approach. These include:

where call endpoints are placed in the network, both physically with respect to network devices and logically with respect to VLAN's, what subset of the possible endpoint pairs will be used to synthesize calls and how many calls should be occurring concurrently, what call duration and inter-call intervals to use, which standard codecs should be simulated when generating RTP packets, and what ports and QoS markings (TOS, Diffserv, VLAN tags) to use for generated RTP packets.

Placement of call endpoints directly affects which part of the network is traversed by the call traffic. In order to draw conclusions about a network, injected voice traffic should cover the entire network. Note that covering the entire network is not necessarily sufficient for the purpose of identifying problematic parts of a network. It is also necessary to be able to distinguish the effect of each hop on call quality. Call duration and inter-call intervals for synthetic traffic affect the precision of the collected measurements. Selection of codec impacts the payload size and the packet transmission rate. QoS markings affect the way network devices handle voice packets. The present approach requires that the synthetic traffic receive the same treatment as the actual voice packets after the deployment of IP telephony equipment.

The eventual analysis of the collected measurements should support the observation of all potential end-to-end QoS problems and support root cause analysis of identifying how the different network elements affect end-to-end QoS. Thus, synthetic voice calls should follow a pattern selected based on the network topology to provide the needed network coverage.

The call generation and monitoring component has a separate user interface that allows the user to specify a sequence of calls, called a call pattern. Each call has the following parameters, a pair of endpoints, QoS setting, codec/payload, packet rate, jitter buffer size, start time, and duration. A single endpoint may be specified to appear any desired number of times within a given call pattern.

During the call generation phase, a call control module automates the initiation of calls and collection of QoS statistics. Endpoint software must be installed on a computer to send and receive synthetic traffic and to collect and report statistics about this traffic to the call control module. Let $E_1$ and $E_2$ be two endpoints in the network running the endpoint software. To initiate a synthetic call between $E_1$ and $E_2$ at time t, the call control module sends control information, including call parameters, at time t to the control agents running on both $E_1$ and $E_2$. $E_1$ and $E_2$ execute the calls and report call statistics back to the call control module. The endpoints compute delay, jitter, and packet loss statistics (such as minimum, maximum and average for each 5 second interval) for each call. The call control module stores the call statistics in the data store 340.

Call patterns are generated using intuitive heuristics. The present algorithm relies on randomly distributing the endpoints but also ensures that endpoint pairs separated by long paths are exercised. The motivation for ensuring long paths is to determine the worst possible delay that voice traffic would incur in the network. Without any prior information on a network, paths that have more hops are likely to have more delay. Many variations on this strategy are possible.

F. Visualization and Analysis

The Visualization and Analysis component performs the key functionality of integrating the information collected by the other components. This integration makes it possible to present the data collected in a meaningful manner for the user to diagnose the performance of the network. Data organization and access mechanism is critical, especially due to the large amounts of data collected by the system and the fact that it is integrating data from a number of sources. These sources not only include the data collected automatically by the discovery, monitoring and synthesis but the user can manually edit the discovery or topology analysis through interacting with the network topology display described below; i.e., by interacting with the visual network topology display the operator can modify or add link entries to the topology and edit other types of discovery, topology or monitoring information. Note that the synthesis component synthesizes end-to-end traffic for a target application and collects the relevant QoS metrics for each synthetic flow. In this section we will refer to this flow as a call.

Figure 16:
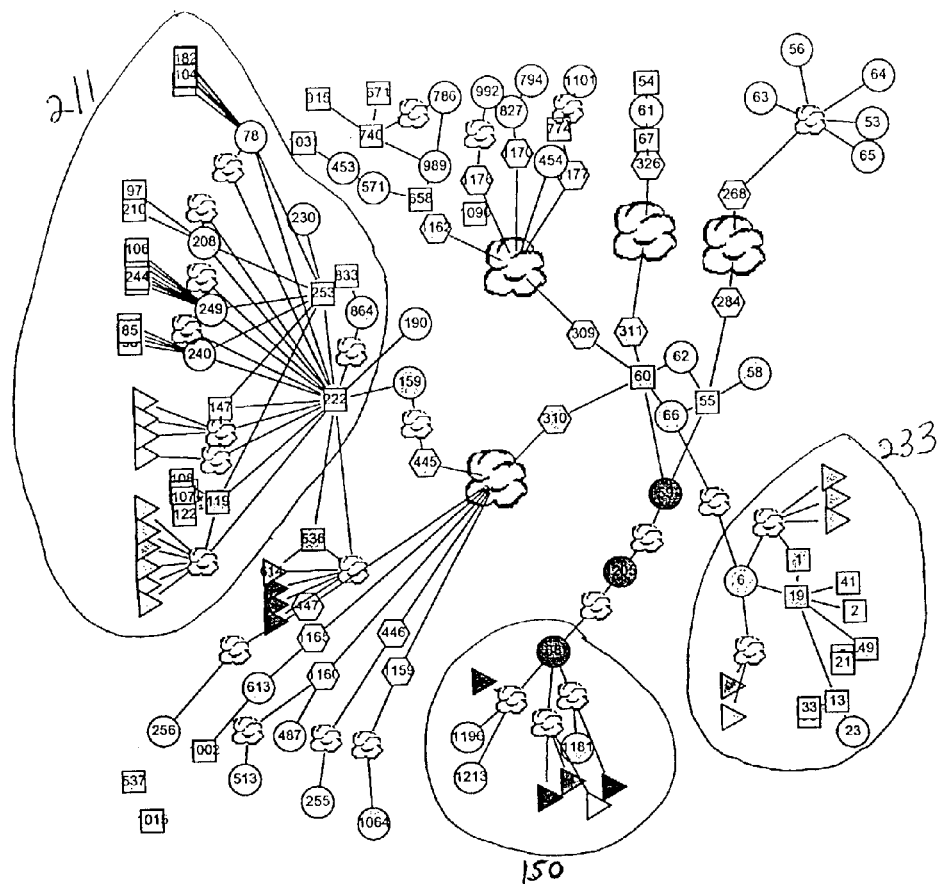
FIGS. 16-18 are diagrams of parts of an example network being analyzed according to the present invention.
Figure 17:
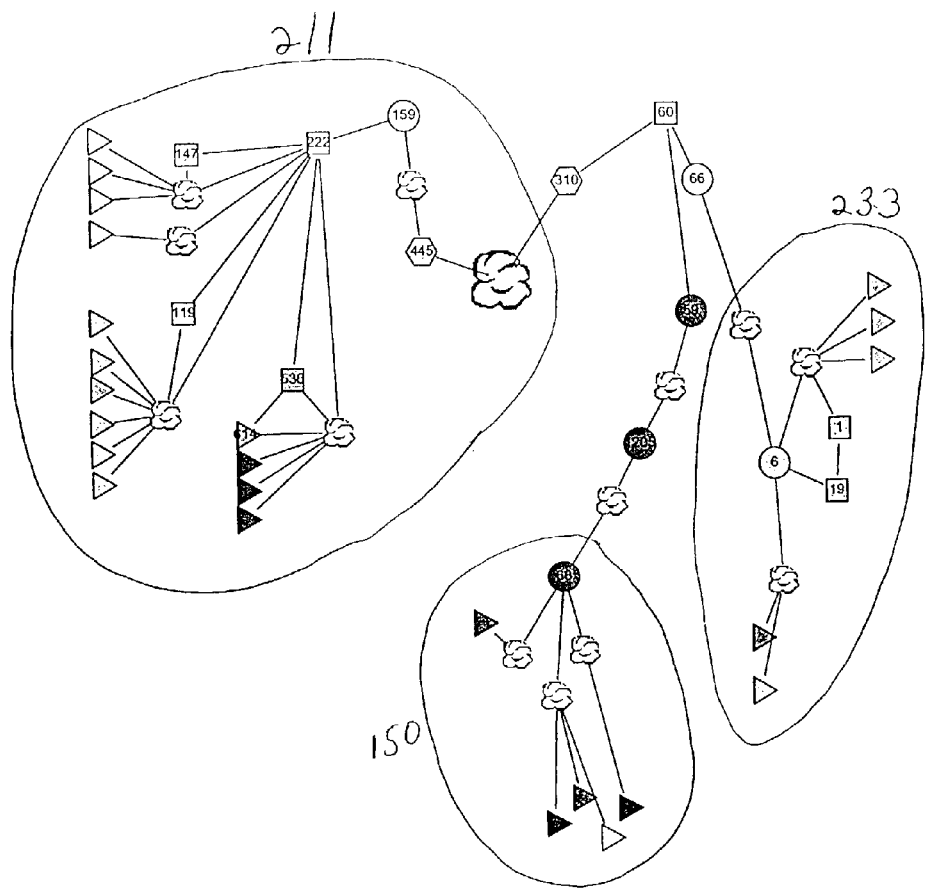

The first type of visualization provided by the invention is the network topology display shown in FIG. 16. This arrangement shows the topology of the network under consideration as discovered by the system. In this system various shapes represent different types of devices. For example in this figure, a router is represented by a circle, a switch is represented by a square and an endpoint is represented by a triangle. Undiscovered devices are represented by one of the clouds. A hexagon indicates a router whose address is known but was not discovered by the discovery component. Lines indicate links between devices. Various legends can also be added as shown in figures such as large rings around sections to indicate a meaningful cluster such as a particular building, with the address given beside it. A device can be labeled with its name, IP address, or a unique number internal to the system. The system also can provide the interface numbers at the ends of a link (not shown here). FIG. 17 shows only a part of the system shown in FIG. 16., namely, the parts of the network that are carrying synthetic calls.

Device monitoring and synthetic call data collected by the system are time dependent. The system provides visualization of network behavior summarized by a slice of time; for example, a convenient slice length parameter might be an hour. A slider keeps track of the summarized time slice. At each time slice, based on the call data collected at that slice, devices in the network are shaded with different colors to indicate their performance with respect to a given metric such as delay, loss, and jitter, or device load, utilization or other performance metrics.

Some examples of the use and definition of colors is as follows. At a given time slice, if all the calls that passed a particular device were within given limits for desired metrics, the device may be colored green. If no calls traversed that particular device, it may be colored white. If a device does not handle any calls within the desired limits for the particular metric the device may be colored red. It would also be possible to utilize a color scale to indicate the proportion of calls touching the device that are not within the acceptable QoS threshold (to show the continuum between 0 and 1, i.e., all calls within threshold to all calls above threshold). That is, if only a few calls are of poor quality, it might be colored light yellow and if many are of poor quality, it might be dark gold. The color purple could be utilized if all the synthesized calls fail, which probably indicates that the endpoint had a problem. By utilizing different colors, it becomes visually obvious where the problems may tie. The indicated network conditions, as described above, can be visualized over time. The result is in a form of a movie where the series of graphs change over time. Thus, it is easy to see during the course of a day, for example, where and when the problems first arise and where and when they later become evident. This may allow the operator to determine the first problem point and deal with that problem to see if it helps the problems that develop later. This particular pattern of change may also help to isolate other problem areas.

Figure 18:
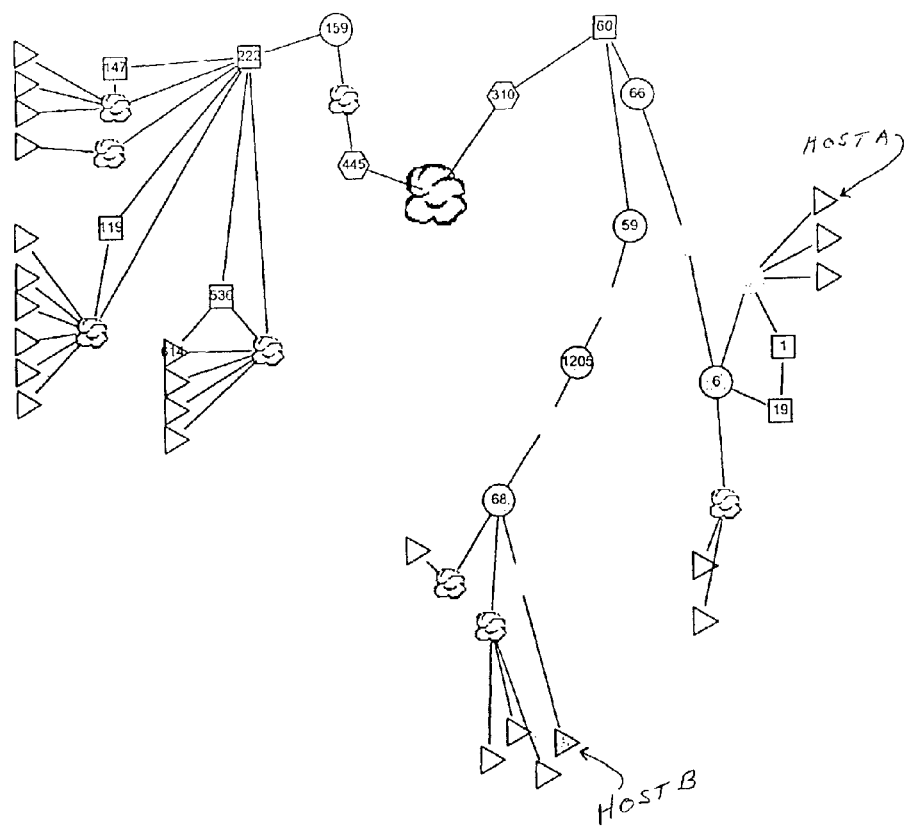

In addition to analyzing the data for individual devices, the system provides visuals for analyzing end-to-end QoS values and the SNMP MIB variables along the path of a call between two endpoints. It also depicts the path between two endpoints on the network graph. FIG. 18 shows the path of voice packets exchanged between two endpoints. This graph is accessible by clicking on a pair of endpoints. This end-to-end path may be colored (shaded in the figure) to distinguish it from the rest of the topology.

Figure 19A:
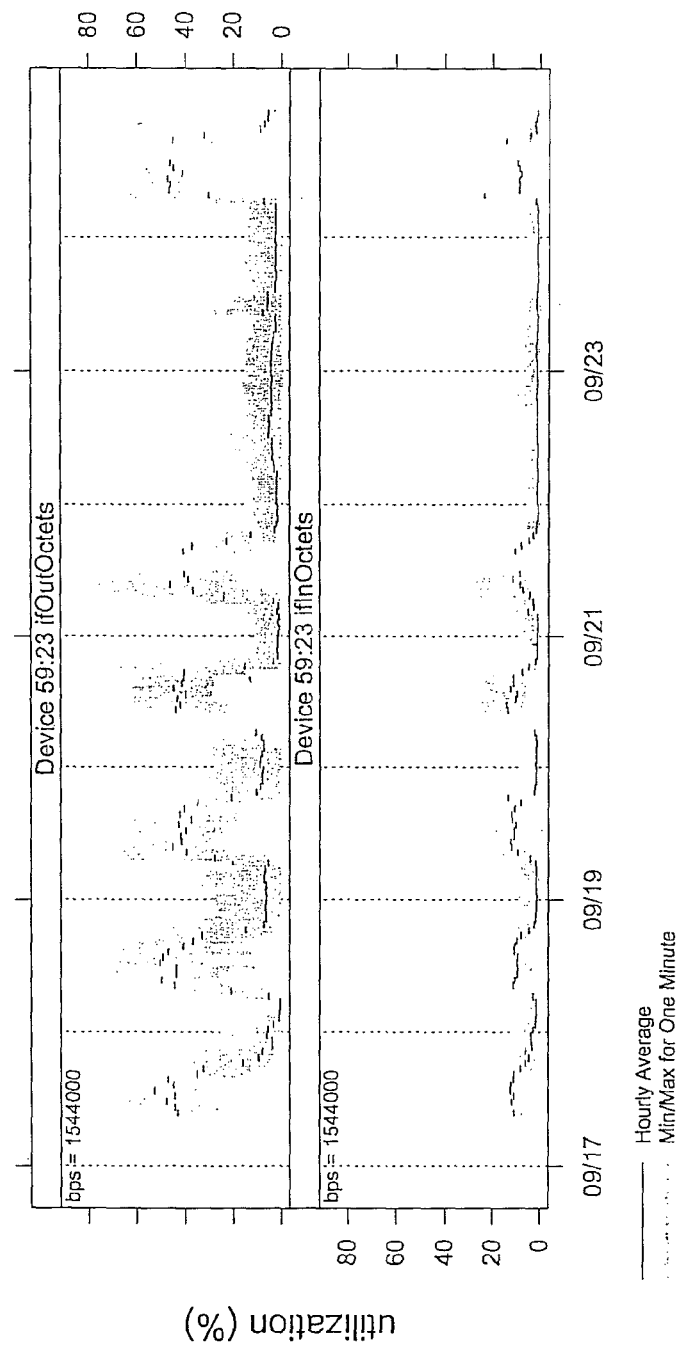
FIGS. 19A, 19B, 20A-D and 21-23 are graphs showing relationships among the various parameters of the network shown in FIGS. 16-18.
Figure 19B:
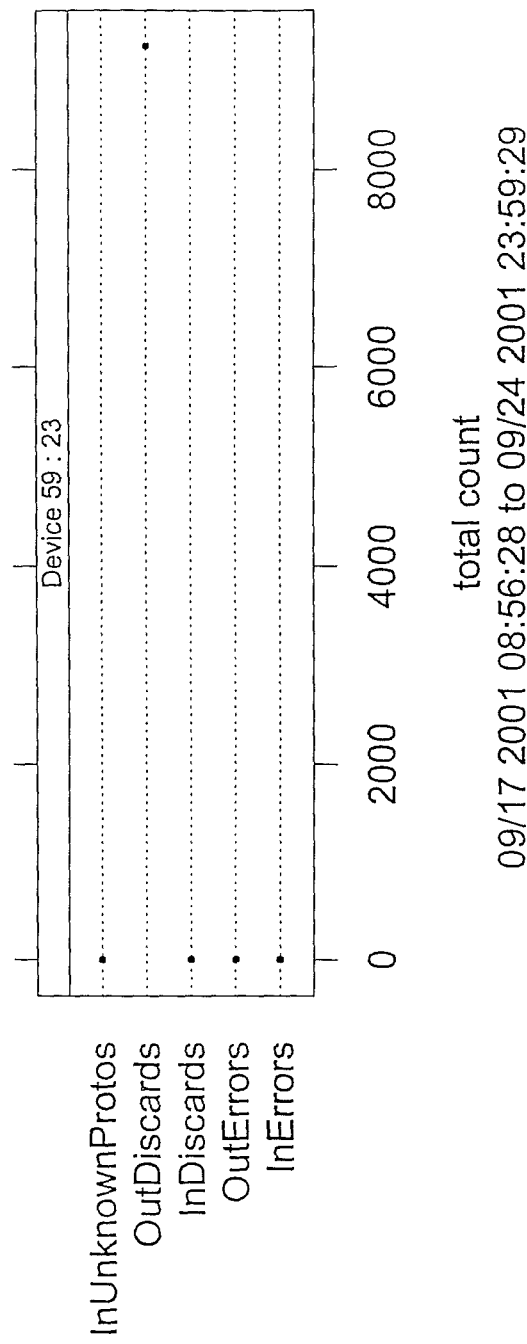

User interaction with the network topology display can be used for a number of different reasons: e.g., to access and change information that was gathered in the discovery phase, to change the placement of links and devices by manual intervention, or to access more detailed views of the collected data. For example, the operator might access detailed information about a device by clicking with the mouse on the device of interest. The system allows access to a number of plots summarizing the collected SNMP data or the detailed metrics about the synthetic call data. For example FIGS. 19A and B shows examples of detailed information available for an individual device. FIG. 19A is a plot of utilization on an interface of a network device over time. Utilization is expressed as a percentage of the device's capacity. For each hour, a dark horizontal line indicates the hourly average and the lighter shaded vertical line indicates the minimum/maximum for one minute during that hour. Graphs are provided both for data going in and out. In this example plot, the two-day period having low utilization corresponds to a weekend between the five-day high utilization periods. High utilization periods are also observable in the mid-section of each day, corresponding to the working hours. FIG. 19B indicates the counts of various types of errors encountered on the device interface during data collection period. In the example, out discards have a high count. Error counts provide further insight to understanding the nature of the problem.

Figure 20A:
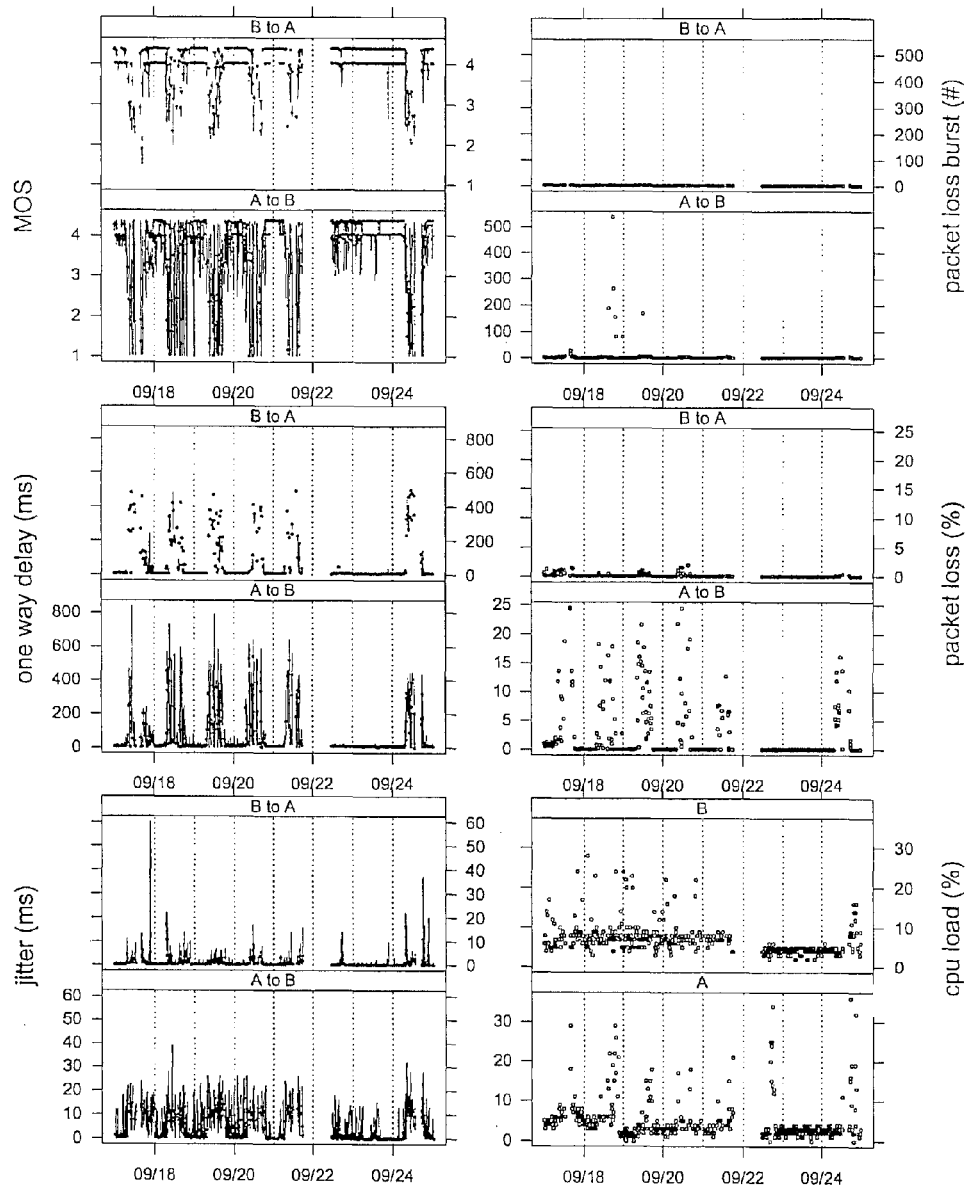

Other example graphs are shown in FIGS. 20A, 20B, 20C and 20D. FIG. 20A shows six pairs of plots representing the QoS metric statistics for all the calls generated between two endpoints. Each pair of plots in the left column and the top two pairs of the right column shows an end-to-end QoS metric statistic in both directions. The A to B direction is the bottom panel and the B to A direction is the top panel of a plot. Each dot (could be colored red) and the grey lines emanating from it represent the average and the minimum and maximum value, respectively, of the particular QoS metric statistic for the calls. The shaded rectangles (could be colored green to denote within threshold) represent the acceptable values of the corresponding QoS statistic. The bottom pair in the right hand column shows CPU load on the two host endpoint computers. In each panel dashed lines depict either daily or hourly demarcations.

Figure 20B:
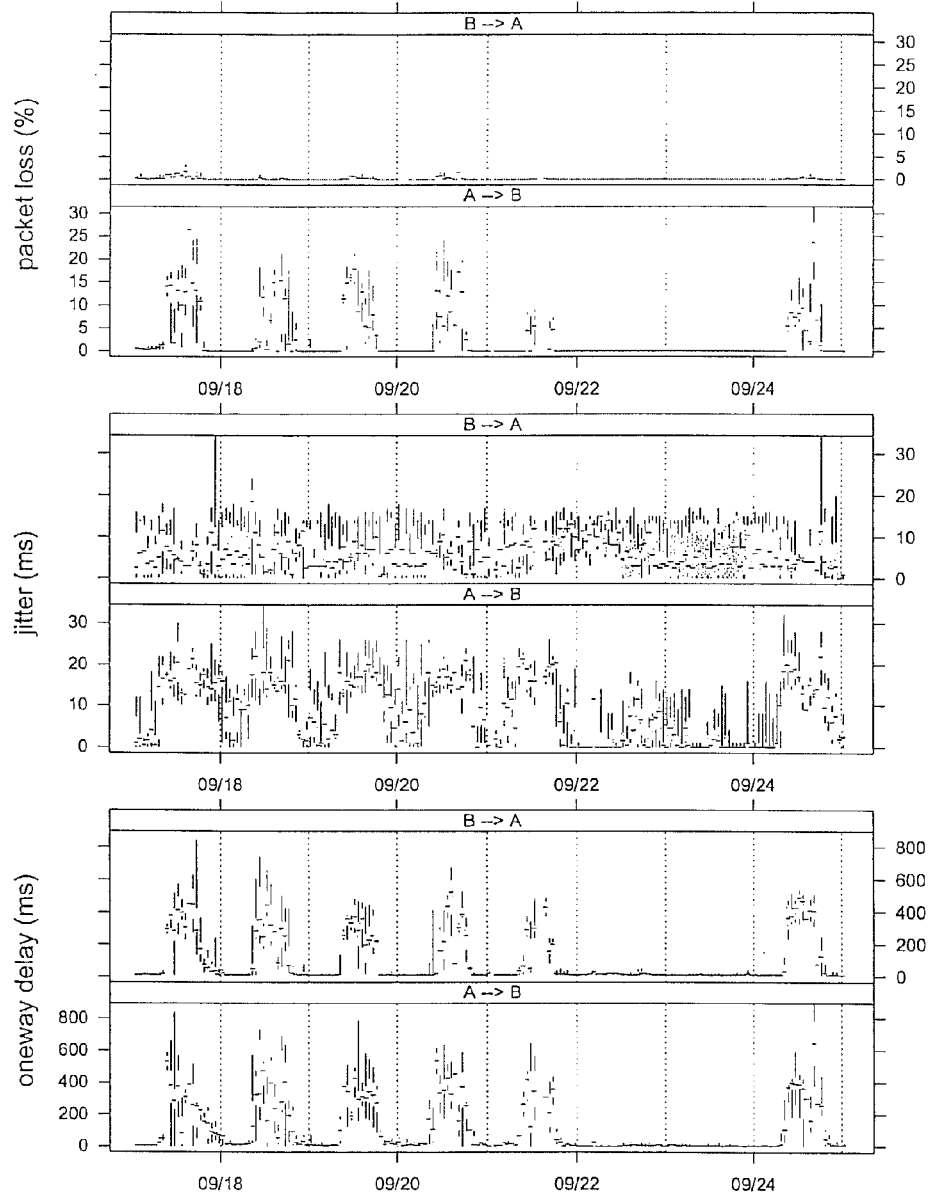

Another example graph of the end-to-end QoS metric data is shown in FIG. 20B. In this figure three pairs of graphs are shown, each of which corresponds to one of the three metrics: packet loss, jitter and one-way delay. The difference between these plots in FIG. 20B and those in FIG. 20A is that the preceding ones show end-to-end QoS values between two endpoints, whereas the plots in FIG. 20B summarize all the end-to-end QoS values over all pairs of endpoints for which the call takes the same path between their closest switching devices. Each metric pertaining to synthetic voice calls exchanged between all the endpoints off of switching device A and off of switching device B is graphed over the data collection period. A shaded area or horizontal line indicates the threshold below which a measurement is considered to be of good quality. For each hour of data collection, the following are also marked on the plot: horizontal hourly median, minimum to maximum by the vertical line, and intermediate shading to indicate the 25 to 75 percentile range.

Figure 20C:
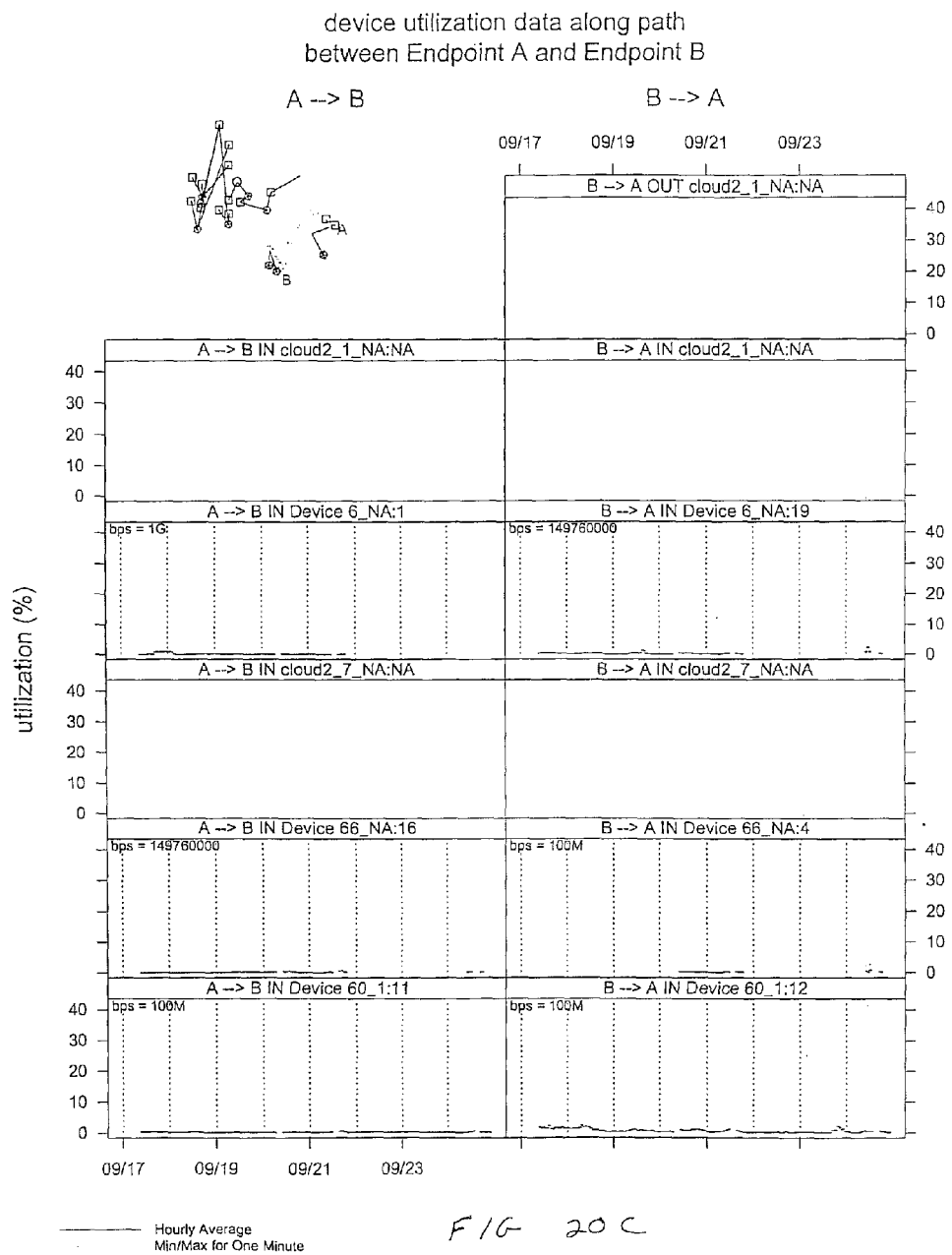
Figure 20D:
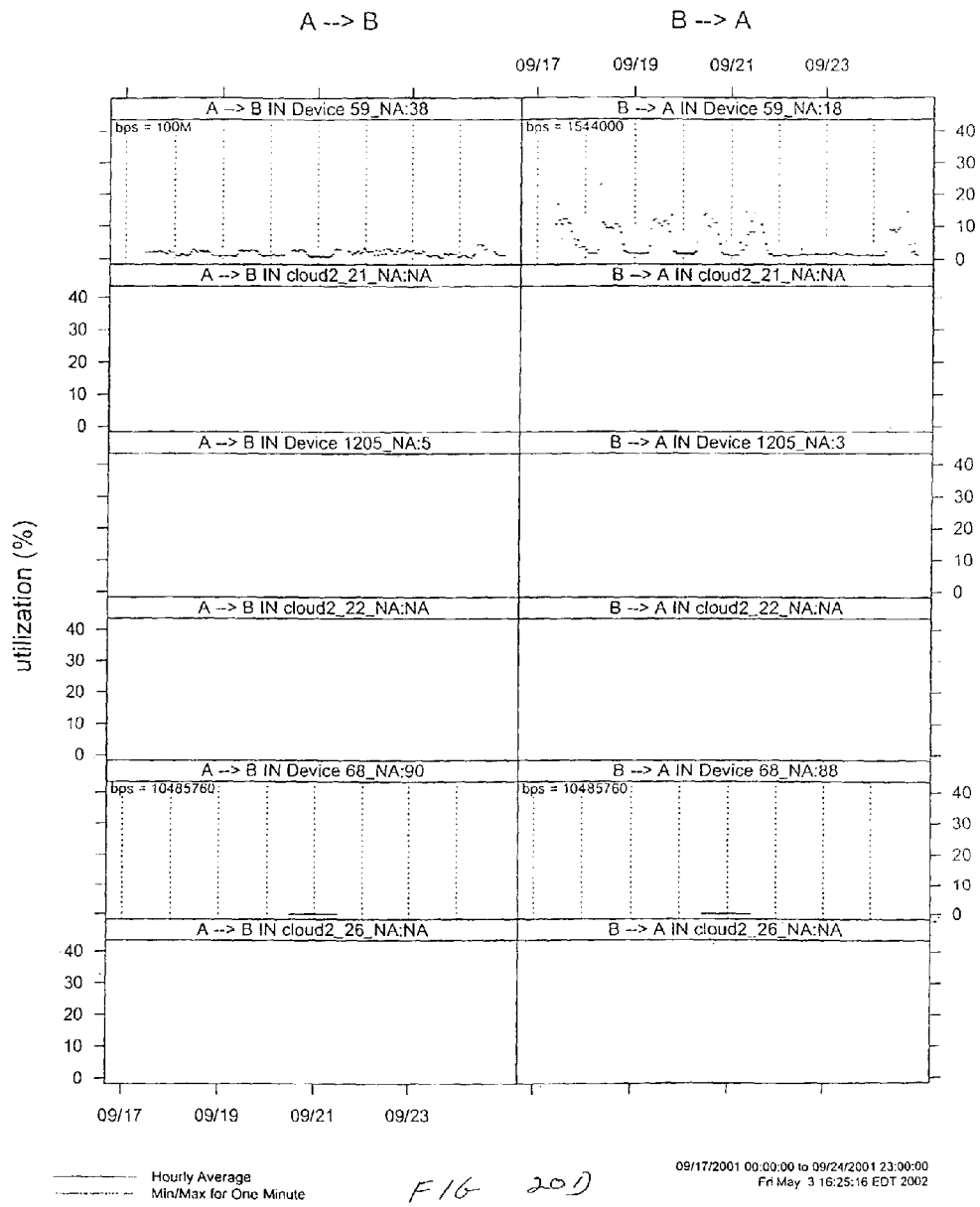

The device or link data along the path of a call can be visualized and thus be related to the end-to-end QoS behavior. FIGS. 20C and 20D together show one example. These figures summarize the network utilization levels on each link on the call path between the endpoints of FIG. 20A or 20B with respect to time. Time scales for the plots in FIGS. 20A, 20B, 20C and 20D are the same. Utilizations (or MIB values) in each direction of the path are shown in FIGS. 20C and 20D. The A to B direction is read in the left column from top to bottom, and the B to A direction is read in the right column from bottom to top. Note that in cases where link utilization information is not available or that there is a cloud along the path, the plot corresponding to the link is left empty.

The plots in FIGS. 20B, 20C and 20D provide the unique ability to relate the end-to-end quality observed between two endpoints at a given point in time to the network conditions at the same point in time. With these plots, the user can determine which links on the call path, if any, impact the call quality adversely.

Figure 21:
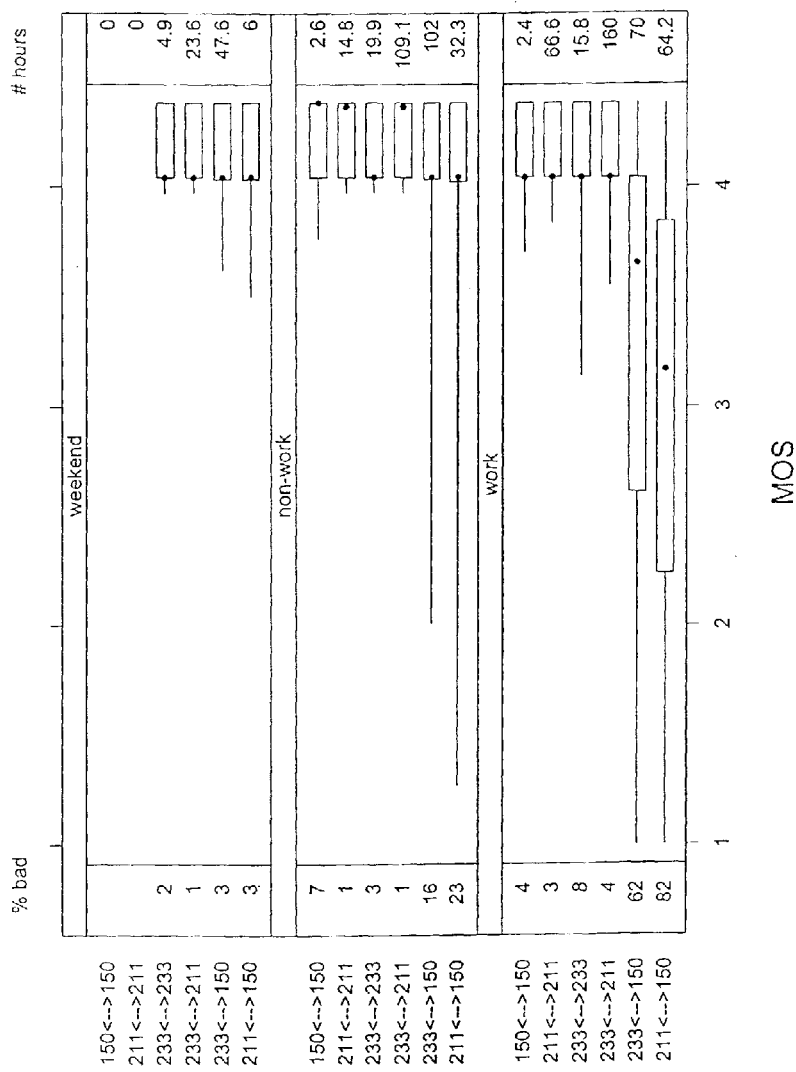

FIG. 21 shows an example of a summary plot to indicate the overall quality of synthesized calls injected into the network. Three separate time periods are established indicating weekends, non-business hours and business hours. Next the endpoints are grouped by some variable of meaning (e.g., location, floor, building). In this plot the endpoints were grouped by their location: 211, 233, or 150. In the sample plot in FIG. 21, these numbers refer to the three groups shown in FIG. 17. The call data is then grouped by pairs of locations called path groups. In general, the path groups are selected to group parts of the network in a meaningful way. Thus the top line in each of the three plots indicates calls within the 150 location. The second line from the top in each plot indicates calls within the 211 location and the third line indicates calls within 233 location. The remaining three indicate calls placed between two different locations. On the right-hand side the figures indicate the number of hours of monitoring of the calls contained in the path group during the particular time period, e.g., business hours. On the left-hand side of the figure is indicated the percentage of calls that were outside of the threshold of the particular QoS metric (i.e., percentage of bad calls). Along the horizontal axis is an end-to-end QoS metric statistic. MOS is shown in this example. Recall that MOS score has a scale of 1-5 indicating the quality of the call. Generally a number of 4 and above is considered good. Accordingly, the area above the number 4 is shaded to indicate that these calls are not a problem. In addition, the percentile ratings of the calls are indicated by system so that it can be determined visually how the calls are spread out along the MOS scores for each pair of groups and time period. A dot is given at the 50th percentile and a rectangular box is used to indicate the spread of 25th to 75th percentile. The 50th percentile dot is always within this box. A single line extends outwardly from the end of the box to indicate the spread of the remaining 25 percentile scores on each end. Thus, this is an example of a summary view that can aid the operator in looking in the right area for problem switching devices.

Figure 22:
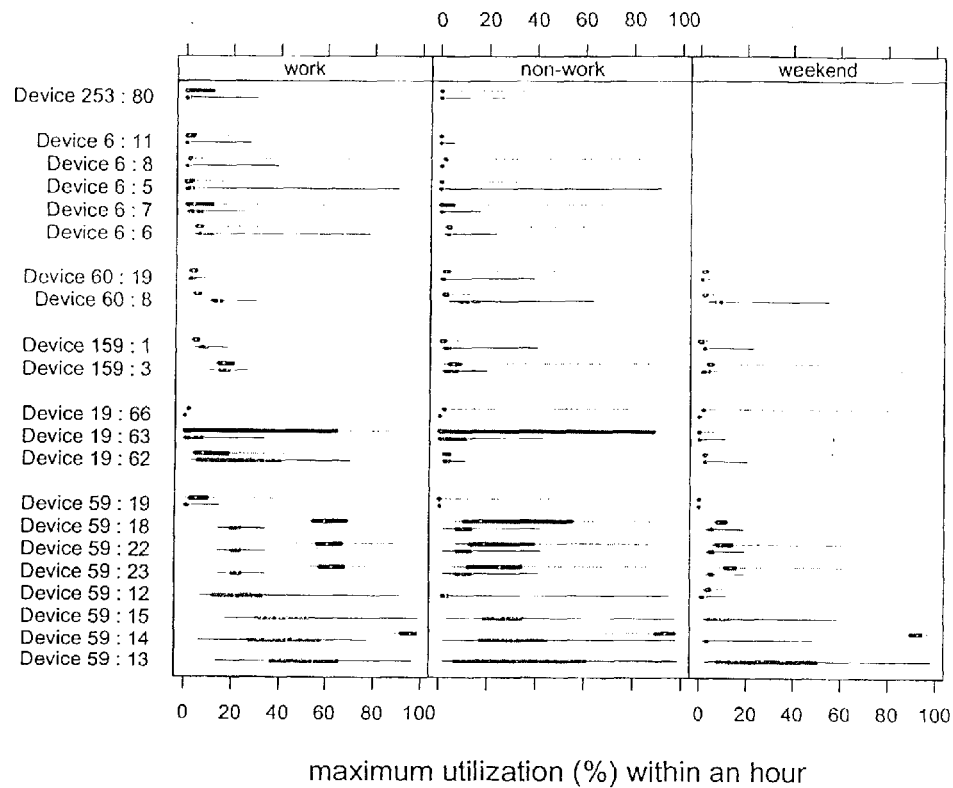
Figure 23:
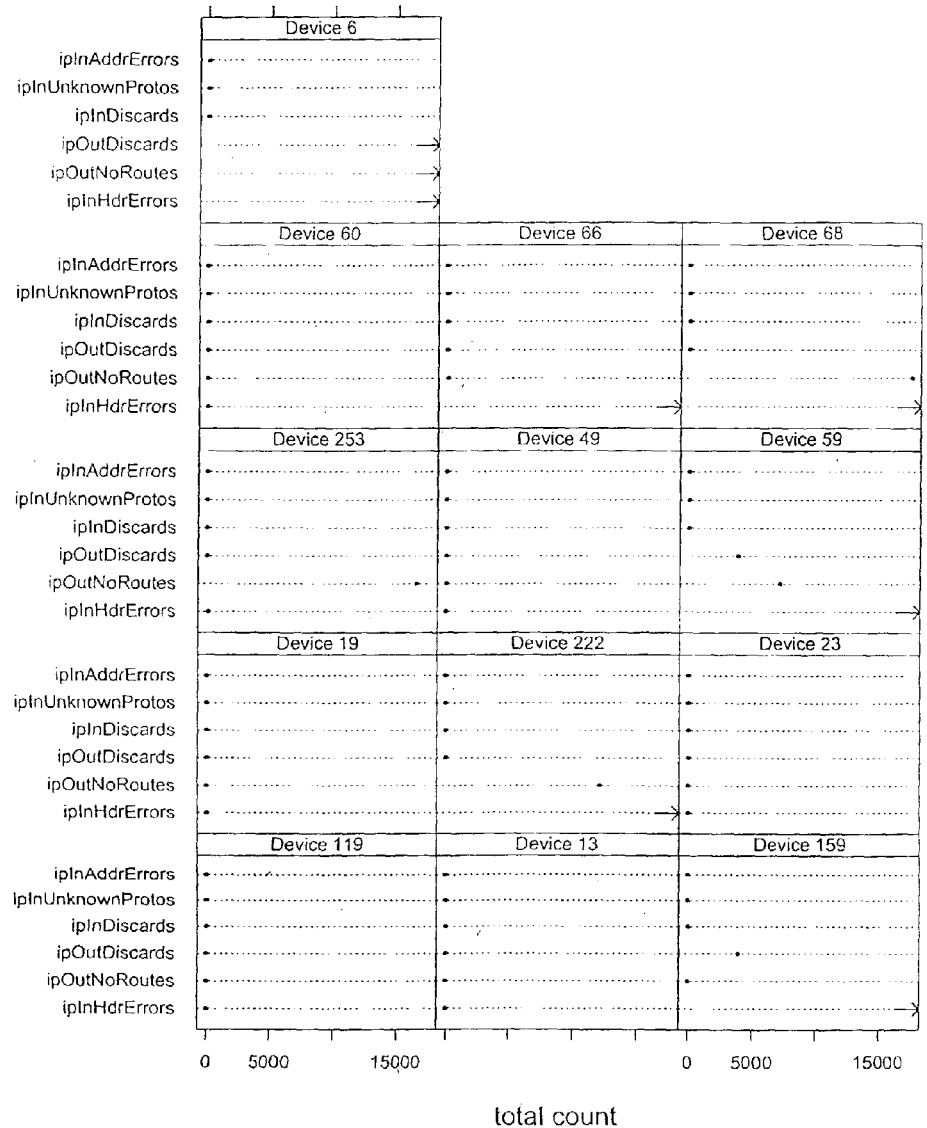

FIG. 21 is an example of one of the summary plots of the synthetic call data. The system contains numerous other summary graphs, including some that depict only the switching device data. Two such examples are shown in FIGS. 22 and 23. FIG. 22 provides a high level view of the most heavily utilized interfaces across all the devices within the network that were monitored. Each hour of data is summarized by the highest one-minute utilization. Then these values are grouped by work hours, outside of work hours and weekends. Only those interfaces that have at least one minute of utilization during the monitoring period above a chosen threshold are shown here. For this example the threshold was chosen to be 30%. For each interface that has either an inbound or an outbound one-minute utilization >30% we show two box and whisker plots. The bottom one is for inbound traffic and the top one for outbound traffic. The median one-minute values are the dots, the thick line goes from the $25^{th}$ to the $75^{th}$ percentiles and the thin lines go from the minimum one-minute utilization to the maximum one.

Other types are summary graphs are useful for other types of data. For example, some device statistics are counts. For these variables the total count within a period of time might be of interest to the user. FIG. 23 shows an example of how total counts can be conveyed across all such count variables and across all monitored devices. Each panel shows the total count of each variable listed at the left for one switching device. Total Count is denoted along the horizontal axis. The range of the horizontal axis is limited by a chosen adaptive criterion so that any very large value does not make the rest of the values unreadable. For any variable/switching device combination that is larger than the max of the horizontal axis range the count size is depicted differently. Some examples of how to do this is by showing different plotting character, such as the arrow shown in FIG. 23 or possible displaying the exact count as this plotting character.

A number of other displays can be generated either in the form of tables or graphs which provide various types of information to the user. In many cases, it is possible to access different displays either by clicking on various points in the current display or by calling up a menu of displays and selecting the one which is desired. FIGS. 24-27 are flowcharts that show how some of the displays can be generated.

Figure 24:
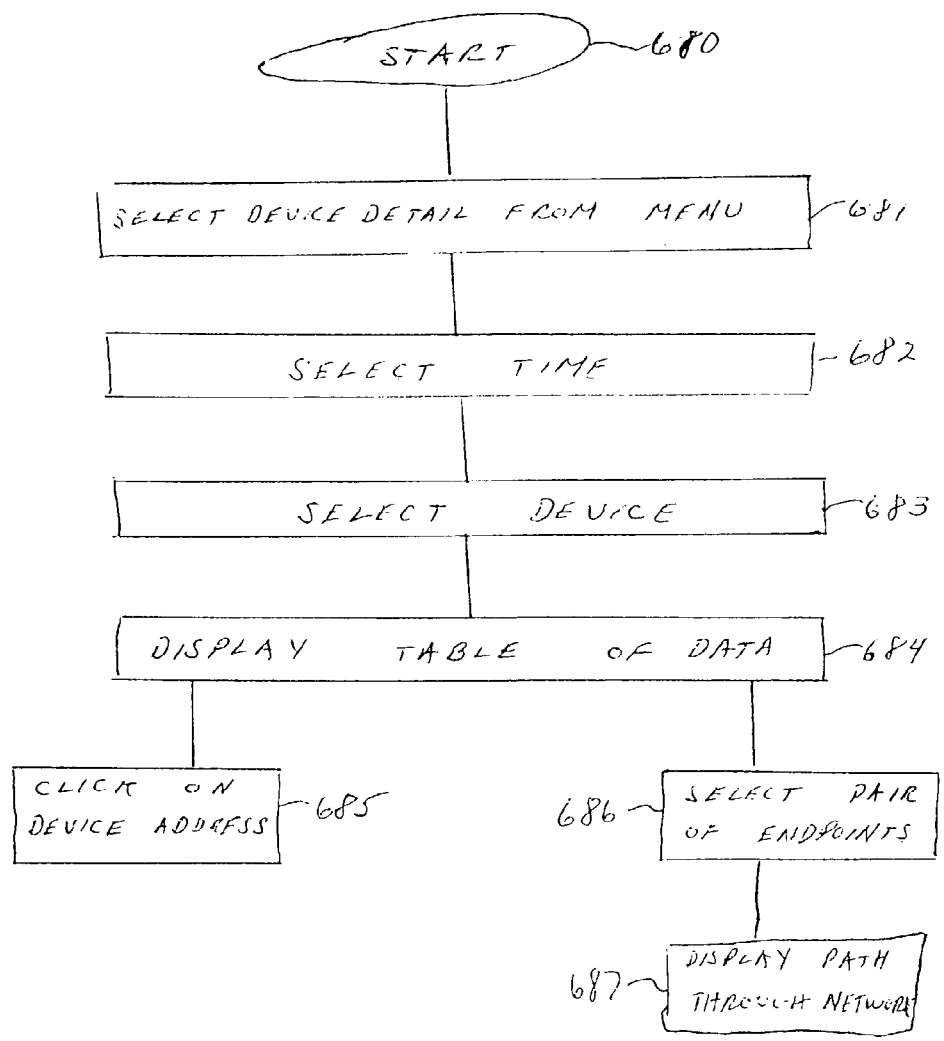
FIGS. 24-27 are flowcharts of the methods for generating graphs for a network analyzed according to the present invention.

FIG. 24 is a flowchart that details how the operator can produce additional displays showing other details of the various devices. Starting at step 680, the operator starts the network topology visualization application and in step 681 selects the device detail selection from the main menu. In step

682, the operator also selects the time of interest using the slider and the time range selection for the horizontal axes in the graphs in the View menu. In step 683, the operator selects a particular device of interest by clicking on the representation of the device in the network display. A table is then produced which gives details concerning the numbers of total calls that passed through the device at the time interval of interest, how many out of this total are poor calls, and where the calls have originated and ended. It also provides information regarding the device itself. Some of the information in the table is further highlighted to indicate that further displays may be obtained by clicking on the highlighted area. By clicking on a highlighted device IP or name (685) the user can obtain plots pertinent to the particular device. The flowchart of the choices of switching device plots is in FIG. 25. Three choices are shown in 623, 624 and 625 of FIG. 25. By clicking on a pair of endpoint addresses (686) the user can obtain access to plots pertaining to the pair of endpoint addresses or all endpoints along the same path as the chosen pair of addresses. Possibilities of such plots are described in 643, 644 and 645 of FIG. 26. Further information on these plots will be described subsequently.

An additional interaction in selecting a pair of endpoints in step 686 can cause the path to be displayed on the network topology graph between the endpoints in step 687. This has been described already with respect to FIG. 18.

Figure 25:
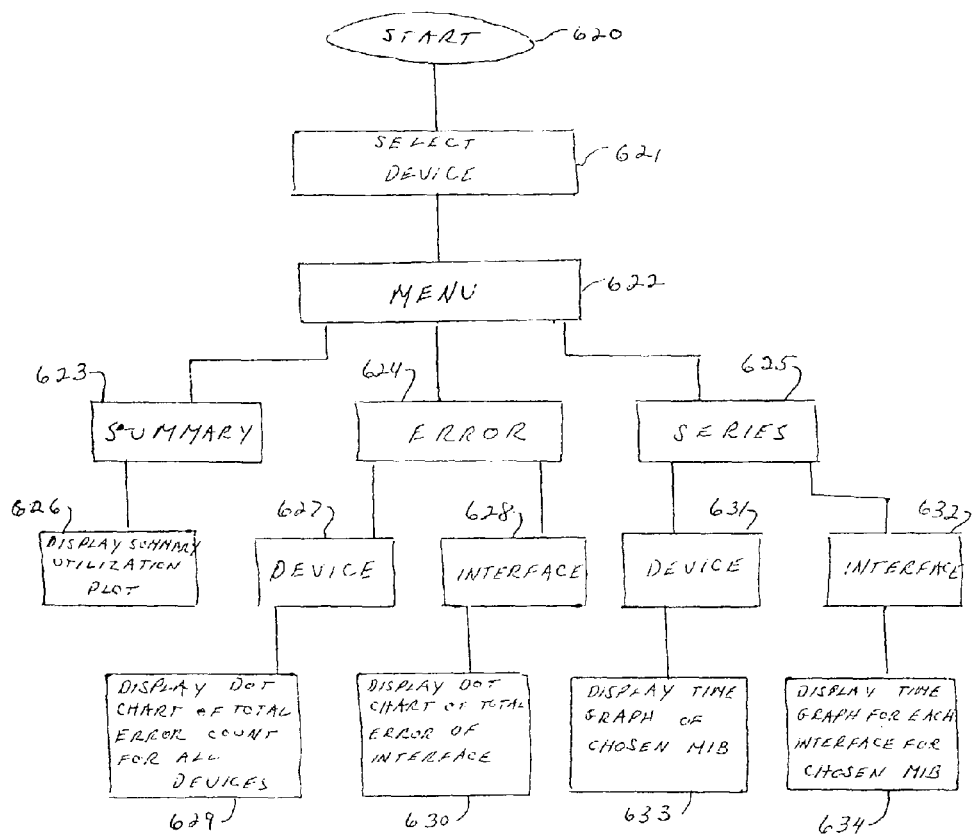

FIG. 25 shows a further flowchart regarding the generation of device plots mentioned above in step 685. Starting in step 621, the operator selects a particular device by name. A menu window is called up in step 622 to select one of three plot types, namely, summary, error or time series plots. These three choices are shown in steps 623, 624, and 625. When the summary plot is chosen, a summary utilization plot is generated in step 626. This plot is similar to that shown in FIG. 22 except that it shows the inbound and outbound utilization on each interface of one device. It has three sections related to work, non-work and weekend time frames. It also utilizes the box and whisker plotting style shown in FIG. 22. However, in this plot the maximum one-minute utilization shown separately in both the inbound and outbound directions may be plotted against the corresponding interface on the chosen device.

If the error plot is selected in step 624, the operator then has a choice of the device or interface specific plot as shown is step 627 and 628. These are selected by menu. If the device specific type is selected in step 627, a display is generated in step 629 to show a plot of the total count of each of the device error MIB variables over the selected time period. This chart includes two parts, the first part displaying the total count of each of the variables in a fashion similar to that in FIG. 19B. The second part generates a more detailed plot for each error type that has a large count. An example of such a detailed plot may be similar to the time plot shown in FIG. 19A. This more detailed graph displays the count by hour for those error types.

If the interface type is selected in step 628, a display is generated in step 630 to show a dot chart of total errors for each interface number. For variables with a large count on an interface more detailed time plots will also be shown.

If the time series option is chosen in step 625, the operator may then also select between device type in 631 and interface type in 632. If the device type is chosen, a display is generated as indicated in step 633 of a time graph of the chosen variable. This time graph can show the one-minute values or hourly averages can also be included. If the interface type is selected in 632, the display is generated in 634 of a time graph of each interface for the chosen variable. If the chosen variable is traffic then either raw counts or utilization can be chosen.

Figure 26:
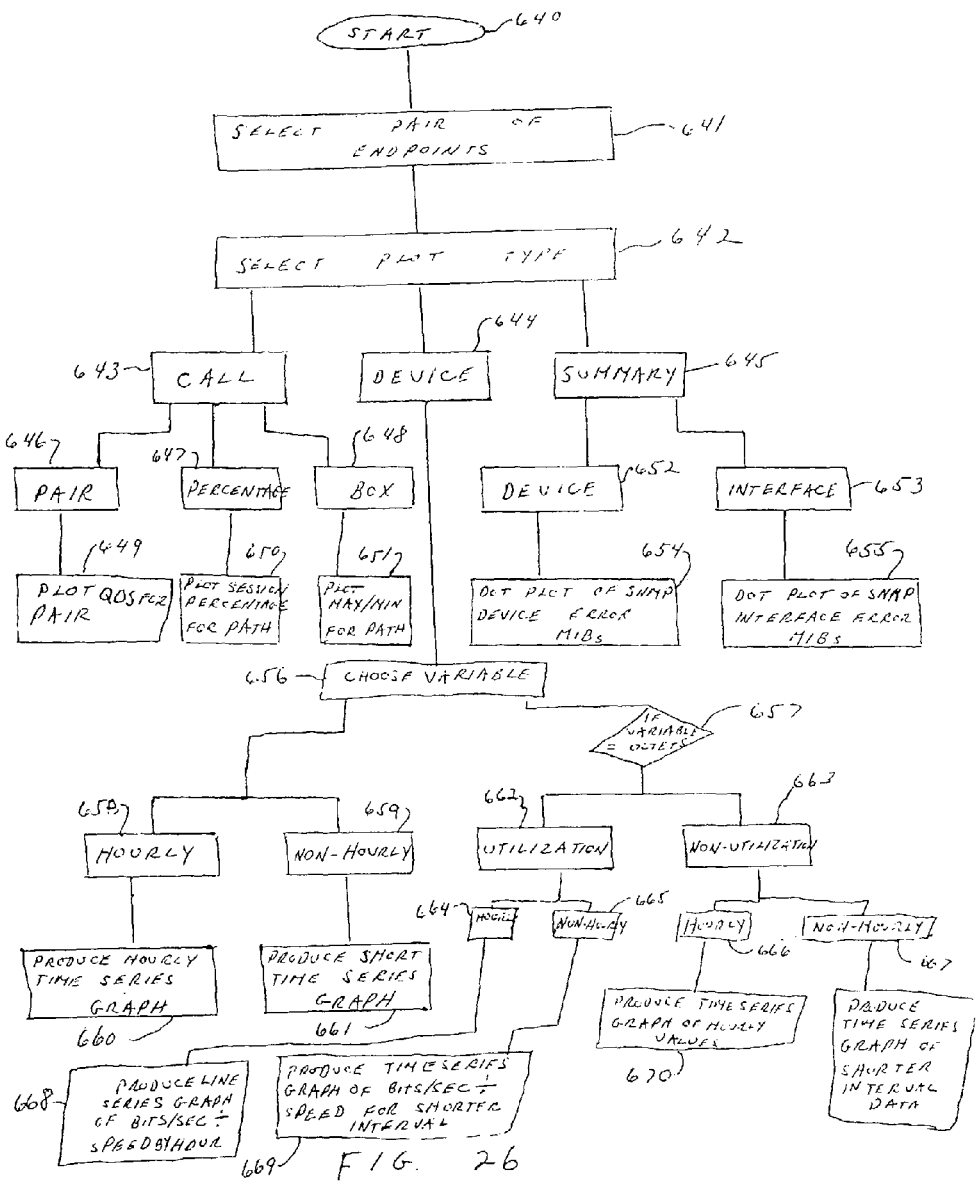

In FIG. 26, the operator starts at step 640 and selects a pair of endpoints in steps 641. The operator then selects the plot type by menu in step 642. Three possible selections are the call type plot shown in step 643, the device type plot shown in step 644 and the summary type plot shown in step 645. If the call type is selected, the user may obtain displays of the QoS variables between two endpoints or along one path taken by calls. If the device plot is chosen, the user may obtain displays of a chosen interface or device variable over time and over the path of the call between the two endpoints. If the summary type is chosen, the user can display summary plots of a chosen variable over the path of the call between the two endpoints.

If the call plot is selected in step 643, the user then may select between the pair type in step 646, the percentage type in step 647 or the box type in step 648. The selection of each of these types generates corresponding plots in steps 649, 650 and 651. The plot pair display of step 649 shows separate plots for the various metrics over time for the selected pair (described in FIG. 20A). These may also be displayed for the two separate directions.

The percentage plot of step 650 shows the number of calls that exceed the quality of service threshold for each of the metrics. The path plot of step 651 displays data for all end-point pairs whose paths that match that of the selected endpoints (described in FIG. 20B). The plots display each of the QoS metrics against time.

If the device type is selected in step 644, first the user needs to choose the variable of interest in step 656. A time series plot of the chosen variable is shown for each device along the path of the call if the chosen variable is a device variable. If the chosen variable is an interface variable a time series plot of the chosen variable for the particular interface touched by the call for each device along the path of the call is plotted. An example of this plot is described in FIG. 20C. The operator has the option of selecting the hourly button 658 (664 or 666 if the variable is Octets), or not and to select the utilization button 662 or not if the chosen variable is Octets. If the hourly button is not selected, a shorter time period is used in steps 661, 669 or 667. When the hourly button is selected in either steps 658, 664 or 666, a display is produced in step 660, 668 or 670 respectively of time series graph of hourly values. In this, the hourly averages of a particular SNMP variable are plotted along with the minimum and maximum one-minute values in each hour for each device and interface along the path of a call if an interface variable was chosen or for each device along the path of a call if a device variable was chosen. This is in contrast with the display produced in either 661, 669 or 671, when the hourly button is not selected in steps 659, 665 or 667 respectively. In these cases the data are plotted by polling intervals. These polling intervals are much shorter than an hour and are typically 10 seconds or 60 seconds long, as indicated previously.

If the utilization button is selected in step 662, a display is produced which is a time graph of bits per second divided by the speed of interface touched by the calls for each device along the path of the call. If the utilization button is not selected as in step 663, a graph is produced in steps 670 or 671 of a time graph of bits per second for each device or interface along the path of the call.

If the summary selection is made as step 645, it is possible to select either the device in step 652 or the interface in step 653. If the device is chosen, a display is generated in step 654 which is a dot plot of the SNMP device errors for each device and error SNMP Mib variable that was monitored along the path of the call between the two endpoints. If the interface is selected, a display is generated in step 655 which is a dot plot of the various error types for each interface on each device touched by synthetic call data between the two endpoints.

Figure 27:
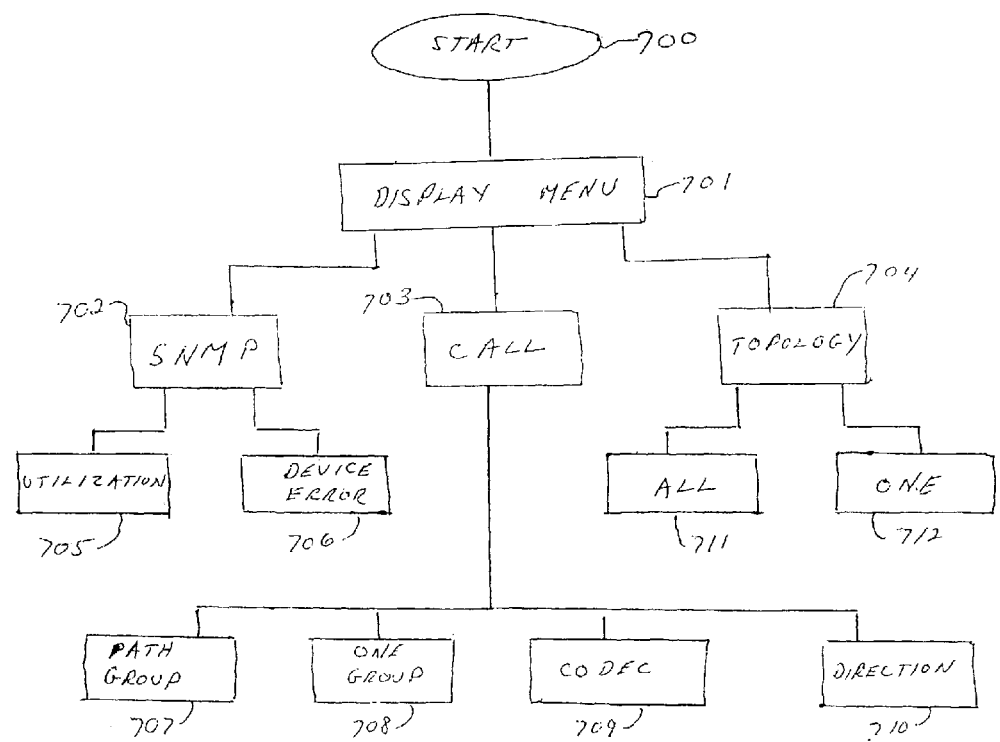

Another type of plot which may be generated is the summary plot. FIG. 27 is a flowchart that shows the selection of various summary plots. The operator begins at step 700 and causes a menu to be displayed in step 701. A menu then allows a selection of three types of plots, the SNMP plot, the call plot and the topology plot. These choices are shown in steps 702, 703 and 704. If the SNMP type is selected in step 702, a utilization plot or a device error plot can be chosen for display. If utilization is selected, the display is of a summary box plot of inbound and outbound utilization for all interfaces on each device that have a maximum minute utilization greater than a cutoff value (described in FIG. 22). If the device error plot is chosen in step 706, a display is produce of a summary dot chart of the total error counts for each device error variable for all devices having SNMP turned on (described in FIG. 23).

If the call type is chosen in step 703, the operator can chose one of four types from the menu: the path group shown in 707, one group shown in step 708, codec in step 709 and direction in step 710. If path group is chosen, a summary box plot of the path groups and time slots is produced. This plot is similar to that shown in FIG. 21. If one group is chosen, a summary box plot is displayed where call data for a particular path group is summarized for each of the paths that begin or end in the two groups of interest and each time slot. If codec is chosen in step 709, a display is produced of a summary box plot which plots the call data for each codec and time slot. If the direction option is chosen step in step 710, a display is produced of summary box plots showing the data for each path group that the selected group is a part of and for each direction separately and for each time slot.

If the topology option is selected in step 704, the operator may select between all in step 711 and one in step 712. If all is selected in 711, a display is produced which depicts each distinct path through the network. If one is selected in step 712, a display is produced which depicts all the paths that call through the network from the single call group.

Thus, these flowcharts indicate that additional types of displays and tables may be produced either by indicating the desired plot from the menu and by properly clicking on either the device detail window or the network topology display in previously described views. This particular arrangement allows the user to move from one type of data to another easily so that the operator may pinpoint trouble areas and to determine in general whether QoS for voice over IP will be acceptable.

The system allows exporting data to other applications by accessing the database. The results of queries can be stored in flat files in a tabular format.

Thus, the above three phases indicate a framework for providing tools that facilitate the assessment of IP telephony readiness of a network. As seen above, this framework includes first determining the topology of the network including determining the exact path between two endpoints in the network. Then network device monitoring and injection of synthesized calls occur concurrently. Network devices are polled frequently, such as every 10 or 60 seconds and the topology and monitoring and call QoS measurements are collected in the data store. The monitoring and end-to-end call QoS statistics are time stamped to allow matching in the analysis. The database is used as a source to form graphs, tables and other information that can be employed by the user to determine problem areas and to switch between information displays in order to obtain a further understanding of the workings of the network. Using this type of system, it is possible to easily examine a network and determine whether it is possible to use IP telephony therein.

Although this framework is intended for this IP Telephony as the target application, it can be easily used in assessing the QoS levels in a network with respect to other applications with stringent QoS needs. This system can also be used after IP telephony is installed to determine how it is working and to find problem points. It also can be used to help troubleshoot networks for various problems. It could be used for assessing networks for other purposes than voice systems such as other multimedia applications. In fact, it can be used for multiple types of applications concurrently (e.g., VoIP, video, web, etc.) and report the results in a unified visualization. It can also be used to collect other types of quality of service parameters. It would be possible to embed software of this kind in IP telephones in order to monitor the QoS in the network and the quality of the VoIP calls after deployment. In this manner, the IP phones could be used as test agents for remote monitoring or on-site management. Other types of assessments which can use such a system includes disaster recovery planning, reconfiguration planning, security assessments and tariff arbitrage.

There are a number of reasons for poor quality of VoIP calls including misconfigured networking element, an overloaded link, or improper prioritization for voice traffic. Since individual calls are channeled through numerous elements and links, the reason for poor call performance is typically not easily determined. At the same time, a problem with some locations of the network is likely to affect the performance of any call that goes through that location. Properly attributing blame for poor performance is crucial to any diagnostic effort. Thus a framework such as that described in this document is necessary in order to take into account various performance metrics, network device monitoring, and topology to best determine the location and nature of underlying problems. This makes it possible not only to identify problems early on but also make it possible to change the focus of the measuring process to areas where there is greater uncertainty. In fact, our system has a lot of things that can be reconfigured as necessary during the data collection process (e.g., SNMP polling, subnets chosen for the discovery process, where endpoints are placed, where/when calls are placed, etc.). Decision for this reconfiguration can be dynamically driven by the analysis findings and the behavior of the network.

Numerous additional modifications and variations of the present invention are possible in light of the above teachings. It is therefore to be understood that within the scope of the appended claims, the invention may be practiced otherwise than as specifically described herein.

What is claimed is:

1. A method for discovery of topology of devices in a network, comprising:
   discovering devices in the network;
   discovering connections between the devices; and
   discovering multi-layer paths between devices in the network along the connections, wherein a multi-layer path is defined as a layer-3 path interleaved with a layer-2 path on each layer-3 hop, wherein discovering a multi-layer path includes identifying the layer-3 path, identifying the layer-2 path for each hop on the layer-3 path, and combining the identified paths.

2. The method according to claim 1, wherein discovering devices includes probing addresses in the network and collecting responses to the probes.

3. The method according to claim 2, wherein discovering devices further includes determining a type of each device that responded to the probes.

4. The method according to claim 3, wherein discovering devices further includes identifying aliased addresses.

5. The method according to claim 4, wherein discovering devices further includes filtering responses from special addresses.

6. The method according to claim 5, wherein discovering devices further includes collecting router tables.

7. The method according to claim 6, wherein discovering devices further includes collecting switch tables.

8. The method according to claim 7, wherein discovering devices further includes storing the results in a data store.

9. The method according to claim 1, wherein discovering devices includes using SNMP procedures.

10. The method according to claim 1, wherein discovering connections includes discovering layer-3 connections.

11. The method according to claim 10, wherein discovering connections between devices in the network further includes discovering connections between layer-3 devices to an undiscovered router cloud.

12. The method according to claim 11, wherein discovering connections further includes discovering connections of layer-3 devices to subnets.

13. The method according to claim 12, wherein discovering connections further includes finding an interface used on each device on a connection.

14. The method according to claim 13, wherein discovering connections further includes finding a network address used by the devices on the ends of each connection.

15. The method according to claim 1, wherein discovering connections between devices in the network includes discovering layer-2 connections.

16. The method according to claim 15, wherein discovering connections further includes using switch tables pertaining to a spanning tree algorithm.

17. The method according to claim 16, wherein discovering connections further includes identifying interfaces used by the devices on ends of each connection.

18. The method according to claim 17, wherein discovering connections further includes finding connections for each virtual local area network (LAN) in networks.

19. The method according to claim 1, wherein discovering connections includes finding connections between layer-3 devices and layer-2 devices.

20. The method according to claim 19, wherein discovering connections further includes identifying a minimal region in a layer-2 topology where each layer-3 device may connect.

21. The method according to claim 20, wherein discovering connections further includes using switch table entries and a discovered layer-2 topology to identify the minimal region.

22. The method according to claim 1, wherein discovering multi-layer paths between devices in the network includes discovering interconnections of layer-3 devices.

23. The method according to claim 22, wherein discovering multi-layer paths further includes finding an ingress and egress address for each device along the path.

24. The method according to claim 23, wherein discovering multi-layer paths further includes finding an ingress and egress interface for each device along the path.

25. The method according to claim 24, wherein discovering multi-layer paths further includes combining partial paths in each direction when unable to find a complete path otherwise.

26. The method according to claim 25, wherein discovering multi-layer paths further includes using an undiscovered router cloud to combine partial paths.

27. The method according to claim 26, wherein discovering multi-layer paths further includes using router tables to find a connection from a host to its default router.

28. The method according to claim 1, wherein discovering multi-layer paths includes discovering interconnections of layer-2 devices.

29. The method according to claim 28, wherein discovering multi-layer paths further includes using switch tables.

30. The method according to claim 29, wherein discovering multi-layer paths further includes using locations of endpoints.

31. A system for topological discovery of devices in a network, comprising:
a memory; and
a processor operatively coupled to the memory, wherein the processor is configured to:
identify connections between layer-3 devices;
identify connections between layer-2 devices;
identify a layer-3 path;
identify a layer-2 path for each hop on the layer-3 path; and
combine the identified paths to identify a multi-layer path.

32. The system according to claim 31, wherein the memory is configured to receive and store topological connection data of the network.

33. A system for topological path discovery through devices in a network, comprising:
a memory; and
a processor operatively coupled to the memory, wherein the processor is configured to:
identify a layer-3 path between a pair of layer-3 devices;
identify layer-2 path for each hop on the layer-3 path; and
combine the identified paths to identify a multi-layer path, wherein the multi-layer path is defined as a layer-3 path interleaved with a layer-2 path on each layer-3 hop.

34. The system according to claim 33, wherein the memory is configured to receive and store path data of the network.

35. The method according to claim 1, wherein the topology of the network further includes representations of undiscovered regions in the network.

36. The method according to claim 10, wherein discovering connections further includes finding connections between layer-3 devices and representations of undiscovered regions.

37. The method according to claim 22, wherein discovering multi-layer paths between devices further includes finding connections between discovered devices and representations of undiscovered regions along layer-3 paths.

38. The method according to claim 1, wherein discovering multi-layer paths between devices further includes finding connections between discovered devices and representations of undiscovered regions along multilayer paths.

39. The method according to claim 1, further comprising enabling modifications to the topology by a user.

40. A system for topological discovery of devices in a network, comprising:
a memory; and
a processor operatively coupled to the memory and configured to:
identify connections between layer-3 devices;
identify connections between layer-2 devices;
identify connections between the layer-3 devices and the layer-2 devices;
identify a layer-3 path;
identify a layer-2 path for each hop on the layer-3 path;
combine the identified paths to identify a multi-layer path;

identify connections between discovered devices and representations of undiscovered regions; and reflect user input on interconnections between devices in the network.

41. The system according to claim 40, wherein the memory is configured to receive and store topological connection data of the network.

42. A system for topological path discovery through devices in a network, comprising:
 a memory; and
 a processor operatively coupled to the memory and configured to:
 identify a layer-3 path between pairs of layer-3 devices;
 identify a layer-2 path for each hop on the layer-3 path;
 combine the identified paths to identify a multi-layer path between devices using both layer-3 and layer-2 devices, wherein a multi-layer path is defined as a layer-3 path interleaved with a layer-2 path on each layer-3 hop;
 include representations of undiscovered regions and their connections to discovered devices along layer-3 and multi-layer paths; and
 reflect user input on layer-3 and multilayer paths in the network.

43. The system according to claim 42, wherein the memory is configured to receive and store path data of the network.

44. The method according to claim 1, further comprising:
 interleaving the layer-3 path with the layer-2 path to form a multi-path.

45. A method for discovery of topology of devices, including level-2 devices and level-3 devices, in a network, comprising:
 discovering layer-2 devices in the network;
 discovering layer 3 devices in the network;
 identifying a layer-3 path in the network;
 identifying a layer-2 path for each hop on the layer-3 path; and
 combining the identified paths to identify a multi-layer path.

* * * * *

UNITED STATES PATENT AND TRADEMARK OFFICE
CERTIFICATE OF CORRECTION

| | | |
|---|---|---|
| PATENT NO. | : 8,543,681 B2 | Page 1 of 1 |
| APPLICATION NO. | : 10/270335 | |
| DATED | : September 24, 2013 | |
| INVENTOR(S) | : Bearden et al. | |

It is certified that error appears in the above-identified patent and that said Letters Patent is hereby corrected as shown below:

In the Drawings

In Fig. 4, Sheet 4 of 31, for Tag "350", in Line 1, delete "VISUALLAZATION" and insert -- VISUALIZATION --, therefor.

In the Specification

In Column 2, Line 42, delete "constrict" and insert -- construct --, therefor.

In Column 5, Line 43, delete "k. C. claffy," and insert -- k. c. claffy, --, therefor.

In Column 11, Line 30, delete "DRAWING" and insert -- DRAWINGS --, therefor.

In Column 16, Line 16, delete "ip.ipAcldressTable" and insert -- ip.ipAddressTable --, therefor.

In Column 16, Line 47, delete "dotIdBaseType," and insert -- dot1dBaseType, --, therefor.

In Column 16, Line 56, delete "system," and insert -- system --, therefor.

In Column 19, Lines 12-13, delete "dotldStpPortTable" and insert -- dot1dStpPortTable --, therefor.

In Column 19, Line 19, delete "(ifndex)" and insert -- (ifIndex) --, therefor.

In Column 20, Line 33, delete "dotldStpPortTable" and insert -- dot1dStpPortTable --, therefor.

In Column 20, Line 35, delete "dotldStpPortTable" and insert -- dot1dStpPortTable --, therefor.

In Column 24, Line 39, delete "only," and insert -- only --, therefor.

In Column 30, Line 20, delete "tie." and insert -- lie. --, therefor.

In Column 32, Line 47, delete "Count" and insert -- count --, therefor.

Signed and Sealed this
First Day of April, 2014

Michelle K. Lee
*Deputy Director of the United States Patent and Trademark Office*